(12) United States Patent
Watanabe et al.

(10) Patent No.: US 7,061,699 B2
(45) Date of Patent: Jun. 13, 2006

(54) PROJECTION LENS, PRODUCING METHOD OF PROJECTION LENS AND PROJECTOR HAVING PROJECTION LENS

(75) Inventors: Nobuo Watanabe, Shiojiri (JP); Shuji Narimatsu, Suwa (JP); Tomonobu Machida, Naganoka-ken (JP); Shunji Umemura, Nagano-ken (JP); Shohei Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 10/396,377

(22) Filed: Mar. 26, 2003

(65) Prior Publication Data

US 2003/0210479 A1 Nov. 13, 2003

(30) Foreign Application Priority Data

Mar. 28, 2002 (JP) .................................. 2002-092790
Oct. 25, 2002 (JP) .................................. 2002-310724

(51) Int. Cl.
*G02B 7/02* (2006.01)

(52) U.S. Cl. .................. 359/819; 359/823; 359/808; 359/811; 353/100; 353/101; 353/119

(58) Field of Classification Search ......... 359/808–819, 359/822, 823; 353/100, 101, 30, 119
See application file for complete search history.

(56) References Cited

U.S. PATENT DOCUMENTS 6,226,055 B1 * 5/2001 Koba ............................ 349/5
6,302,543 B1 * 10/2001 Arai et al. ................... 353/70
6,469,839 B1 * 10/2002 Agata ......................... 359/694
2003/0081185 A1 * 5/2003 Nakano et al. ............... 353/97

FOREIGN PATENT DOCUMENTS

| JP | 52-50731 | 10/1975 |
|---|---|---|
| JP | 56-10606 | 7/1979 |
| JP | 55-147008 | 4/1980 |
| JP | 2-83513 | 6/1990 |
| JP | U 3-45505 | 4/1991 |
| JP | A 4-225037 | 8/1992 |
| JP | U 59-48513 | 3/1994 |
| JP | A 8-304739 | 11/1996 |
| JP | A 2000-66076 | 3/2000 |
| JP | A 2000-066076 | 3/2000 |
| JP | 2002-267915 | 9/2002 |

* cited by examiner

*Primary Examiner*—Ricky L. Mack
*Assistant Examiner*—Brandi Thomas
(74) *Attorney, Agent, or Firm*—Oliff & Berridge, PLC

(57) ABSTRACT

A projection lens (46) comprises: a cylindrical exterior case (621) having a lens-shifting through-hole (625) on a side thereof and an inner circumferential step or inner flange (623); a lens (610) of which outer periphery (611) on a first side is abutted to the inner circumferential step or inner flange (623); a flexible or elastic spacer (660) abutted to an outer periphery (612) of a second side of the lens (610); and a retainer (670) holding the spacer (660), where the lens (610) is fixed on the exterior case (621).

28 Claims, 23 Drawing Sheets

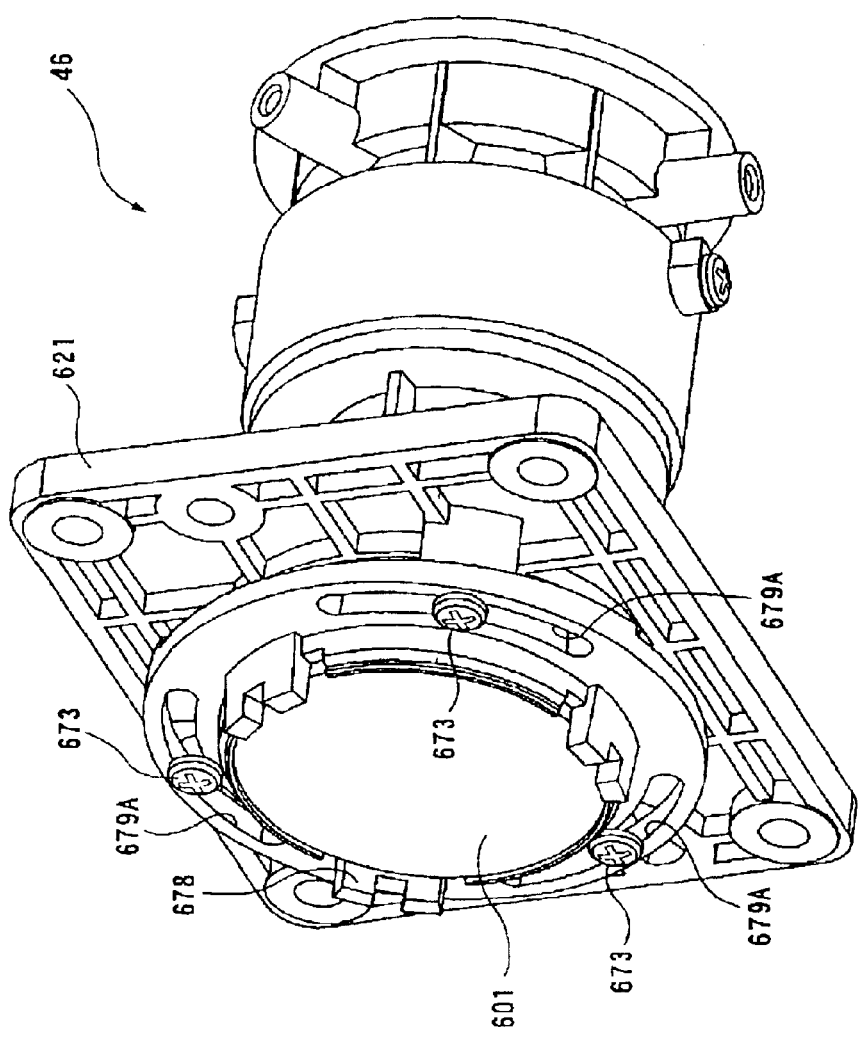

PROJECTION LENS, PRODUCING METHOD OF PROJECTION LENS AND PROJECTOR HAVING PROJECTION LENS

BACKGROUND OF THE INVENTION

1. Field of the Invention

The present invention relates to a projection lens and a projector having the projection lens.

2. Description of Related Art

Conventionally, a projector having a plurality of liquid crystal panels for modulating a plurality of color lights for each color in accordance with image information, a cross dichroic prism for combining the color lights modulated by the respective liquid crystal panels, and a projection lens for enlarging and projecting the light beam combined by the prism has been used.

A projection lens used for such projector is a composite lens constructed by a plurality of lenses including a convergent lens and a divergent lens in order to restrain deterioration of resolution and distortion aberration and chromatic aberration of projected image. However, the optical axis (core) position of the respective lenses of the projection lens has to be adjusted with high accuracy in order to function the lens and maintain the quality of the projected image. Such projection lens capable of adjusting optical position is disclosed in, for instance, Japanese Patent Laid-Open Publication No. 2000-66076 (Page 3, FIG. 3).

FIG. 22 is a cross section showing an example of the conventional projection lens. In FIG. 22, a projection lens 900 has a lens 910, a lens barrel 920 with the lens 910 being fixed therein (referred to as exterior case 920), and a stopper 930 for securing the lens 910 on the exterior case 920.

The exterior case 920 has a first exterior case 921 and a second exterior case 922 slidably provided on the first exterior case 921, where the optical axes of the first exterior case 921 and the second exterior case 922 are aligned.

The projection lens 900 has a first group lens 911, a second group lens 912 and a third group lens 913 fixed on the first exterior case 921, and a fourth group lens 914 fixed on the second exterior case 922.

The stopper 930 collectively refers to the components for fixing the respective group lenses on the exterior case.

A stopper 907 of a lens adapter 908 of the second group lens 912 has an inner wall abutted to a lens-tilting eccentric pin 931 and an outer wall pressed by an O-ring 960, which is supported by an O-ring stopper 970 screwed to the first exterior case 921. In other words, the second group lens 912 is fixed through the O-ring 960.

FIG. 23 is a schematic illustration of the lens-tilting eccentric pin of the conventional projection lens, where FIG. 23A is a cross section taken along a surface orthogonal with an axis core of the first exterior case 921 and FIG. 23B is a side elevation with a partial cross section.

A lens-tilting through-hole 923 is provided on the side of the first exterior case 921 in a plane perpendicular to the axis of the exterior case 920 (referred to as X-Y plane hereinafter) at a constant interval (120 degrees) along circumference thereof. In the figure, the component is attached with additional signs of s, t and u for respective directions. A lens-tilting eccentric sleeve 932 is respectively provided on the lens-tilting through-hole 923 in a rotatable manner.

When the lens-tilting eccentric sleeve 932 is rotated, the lens-tilting eccentric pin 931 guides the lens adapter 908 in a direction perpendicular to the X-Y plane, so that the second group lens 912 engaged by the lens adapter 908 is inclined. In other words, the second group lens 912 is "tilted".

However, in the conventional arrangement, though the tilt of the group lens can be adjusted by fixing the group lens by the lens-tilting eccentric pin, it is impossible to move the group lens in parallel without changing the inclination of the optical group (e.g. movement parallel to the axis of the exterior case: referred to as shift adjustment hereinafter). Accordingly, even when the shift adjustment of the optical axis is necessary relative to the exterior case in which the group lens is provided or the other adjacent group lens, such shift adjustment cannot be conducted.

SUMMARY OF THE INVENTION

The present invention is for overcoming the above disadvantages, of which object is to provide a projection lens and a producing method of the projection lens capable of easily conducting shift-adjustment of a lens group (including a single lens) with a simple construction and a projector having the projection lens.

A projection lens according to an aspect of the present invention has: a cylindrical exterior case having a lens-shifting through-hole on a side thereof; a plurality of lenses; a step portion or flange that is provided on the inner circumference of the exterior case, a periphery of a first side of at least one of the plurality of lenses being in contact with the step portion or the flange; a retainer, and a flexible or elastic spacer that abuts on a periphery of a second side of the lens, the spacer being pressed by the retainer to hold the lens on the exterior case.

According to the above arrangement, since the outer periphery (including outer periphery of the lens adapter) of the lens(es) is held through a flexible or elastic spacer, the lens is stably held without shakiness in a manner capable of parallel (shift) movement.

Accordingly, the tip end of the lens-shift adjuster inserted to the lens-shifting through-hole is pressed on the outer periphery of the lens, so that the lens on which the tip end is abutted can be displaced in accordance therewith. In other words, the lens can be shifted without being tilted (i.e. without changing the angle relative to the axis of the exterior case).

Further, even when the lens-shift adjuster is removed, since the lens is not moved and the lens position after being adjusted is maintained, the lens can be fixed after completing the shift-adjustment and removing the lens-shift adjuster.

In the projection lens according to the above aspect of the present invention, the step portion or the flange may preferably have a ring-shaped projection or an arc-shaped or a dot-shaped projection arranged in circle.

According to the above arrangement, since the outer periphery of the lens is evenly supported by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens.

The projection lens according to the above aspect of the present invention may preferably further have a lens adapter that accommodates the lens, a periphery of the lens adapter being provided with a ring-shaped projection or an arc-shaped or a dot-shaped projection arranged in circle.

According to the above arrangement, since the outer periphery of the lens adapter accommodating the lens is evenly supported by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens. Furthermore, since the lens is protected by the lens adapter, the damage on the lens caused by the shock from the lens-shift adjuster or the outside can be prevented.

In the projection lens according to the above aspect of the present invention, the spacer may preferably have a ring-shaped projection or an arc-shaped or a dot-shaped projection arranged in circle.

According to the above arrangement, since the outer periphery of the lens is evenly supported by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens.

In the projection lens according to the above aspect of the present invention, the spacer may preferably be a plate spring capable of deformation in an out-plane direction According to the above arrangement, since the entire spacer is constructed as a spring, the lens can be held in the exterior case with more appropriate force. Further, when the plate spring is constructed as a ring wavy in circumferential direction, since the portion in contact with the outer periphery of the lens can be more evenly support the outer periphery of the lens or the lens adapter accommodating the lens by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens.

The projection lens according to the above aspect of the present invention may preferably further have: an adjacent-lens that is located adjacent to the lens; and an adjacent-lens adapter that accommodates the adjacent lens, the adjacent-lens adapter working as the retainer.

According to the above arrangement, since no dedicated holder for holding the spacer (referred to retainer hereinafter) is necessary, the number of components can be reduced, so that weight of the projection lens can be reduced, assembly process can be accelerated and production cost can be diminished Further, the spacer can be more securely pressed.

A projection lens according to another aspect of the present invention has: a cylindrical exterior case having a lens-shifting through-hole and a cradle-tilting through-hole on a side thereof; a plurality of lenses; a cradle-tilting eccentric sleeve that is rotatable in the cradle-tilting through-hole; a cradle-tilting eccentric pin having a center that is eccentric relative to a rotation center of the cradle-tilting eccentric sleeve, the cradle-tilting eccentric pin being fitted to the inner circumference of the cradle-tilting eccentric sleeve; a cylindrical cradle that is guided by the cradle-tilting eccentric pin to be capable of tilting relative to the axis of the exterior case; a periphery of a first side of at least one of the plurality of lenses is abutted to a first inner side of the cradle; and a flexible or elastic cradle spacer that is interposed between an outer periphery of second side of the lens and a second inner side of the cradle to hold the lens in the cradle.

According to the above arrangement, the tilt of the cradle accommodating the lens relative to the axis of the exterior case can be adjusted by the eccentric pin to adjust the tilt of the lens. Further, by pushing the outer circumference of the lens held in the cradle through the cradle spacer by the tip end of the lens-shift adjuster inserted to the lens-shifting through hole, the lens can be displaced correspondingly. In other words, both of the tilt-adjustment and shift-adjustment of the lens can be conducted, thereby more accurately adjusting the position of the lens.

Further, since the lens is not moved and the lens position after being adjusted is maintained, the lens can be fixed at the condition.

In the projection lens according to the above aspect of the present invention, the first inner side of the cradle may preferably have a ring-shaped projection or an arc-shaped or a dot-shaped projection arranged in circle.

According to the above arrangement since the outer periphery of the lens is evenly supported by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens.

The projection lens according to the above aspect of the present invention may preferably further have a lens adapter that accommodates the lens, an outer periphery of the lens adapter being provided with a ring-shaped projection or an arc-shaped or a dot-shaped projection arranged in circle.

According to the above arrangement, since the outer periphery of the lens adapter accommodating the lens is evenly supported by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens. Furthermore, since the lens is protected by the lens adapter, the damage on the lens caused by the shock from the lens-shift adjuster or the outside can be prevented.

In the projection lens according to the above aspect of the present invention, the cradle spacer may preferably have a ring-shaped projection or an arc-shaped or a dot-shaped projection arranged in circle.

According to the above arrangement, since the outer periphery of the lens is evenly supported by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens.

In the projection lens according to the above aspect of the present invention, the cradle spacer may preferably be a plate spring capable of deformation in an out-plane direction.

According to the above arrangement, since the entire spacer is constructed as a spring, the lens can be held in the exterior case with more appropriate force. Further, when the plate spring is constructed as a ring wavy in circumferential direction, since the portion in contact with the outer periphery of the lens can more evenly support the outer periphery of the lens or the lens adapter accommodating the lens by a contact portion with a continuous or intermittent ring-shaped linear shape (limited width) or a dotted shape on the circle (limited area), the lens is stably and securely held. Further, when the shift-adjustment of the lens is conducted by pushing the lens-shift adjuster, the lens can be smoothly moved, thereby easily conducting shift-adjustment of the lens without tilting the lens.

The projection lens according to the above aspect of the present invention may preferably further have a through-hole that is formed on the exterior case to inject an adhesive.

According to the above arrangement, since the adhesive can be injected simultaneously with adjusting the position of the lens, the fixing process of the lens can be rapidly conducted.

A projector according to still another aspect of the present invention has: an optical device that modulates a light beam irradiated by a light source in accordance with image information to form an optical image; and the above projection lens that enlarges and projects the optical image.

According to the above aspect of the present invention, since the projection lens of which shift has been adjusted or the projection lens of which shift and tilt has been adjusted is provided, the quality of the projector can be improved.

A producing method of a projection lens according to further aspect of the present invention is for a projection lens that includes: a cylindrical exterior case having a lens-shifting through-hole on a side thereof; a plurality of lenses; a step portion or flange that is provided on the inner circumference of the exterior case; a retainer, and a flexible or elastic spacer, the method comprising the steps of: abutting a periphery of at least one of the plurality of lenses to a first side of the step portion or a flange; holding the lens in the exterior case by pressing a periphery of a second side of the lens with the retainer through a flexible or elastic spacer, and adjusting a shift amount of the lens by shifting the lens with a lens-shift adjuster through the lens-shifting through-hole.

According to the above arrangement, since the tip end of the lens-shift adjustor inserted to the lens-shifting through-hole is pressed on the outer circumference of the lens, and the lens on which the tip end is abutted can be displaced correspondingly to adjust the shift of the lens position, a high-quality projection lens composed of a plurality of lenses where various aberrations between the lenses are eliminated can be produced.

A producing method according to still further aspect of the present invention is for a projection lens, the projection lens that includes: a cylindrical exterior case; a plurality of lenses; a cradle-tilting eccentric sleeve that is rotatable in the cradle-tilting through-hole; a cradle-tilting eccentric pin having a center that is eccentric relative to a rotation center of the cradle-tilting eccentric sleeve, the cradle-tilting eccentric pin being fitted to the inner circumference of the cradle-tilting eccentric sleeve; a cylindrical cradle that is capable of tilting relative to the axis of the exterior case; and a flexible or elastic spacer, the method comprising the steps of: abutting a periphery of a first side of at least one of the plurality of lenses to a first inner side of the cradle; holding the lens on the cradle with a flexible or elastic cradle spacer interposed between a periphery of a second side of the lens and a second inner side of the cradle; adjusting the tilt of the lens by guiding the cradle by the cradle-tilting eccentric pin; and adjusting a shift amount of the lens by shifting the lens with a lens-shift adjuster through a lens-shifting through-hole.

According to the above arrangement, the tilt of the cradle accommodating the lens relative to the axis of the exterior case can be adjusted by the eccentric pin to adjust the tilt of the lens. Further, by pushing the outer circumference of the lens held in the cradle through the cradle spacer by the tip end of the lens-shift adjuster inserted to the lens-shifting through hole, the lens can be displaced correspondingly. In other words, both of the tilt-adjustment and shift-adjustment of the lens can be conducted, thereby more accurately adjusting the position of the lens.

BRIEF DESCRIPTION OF THE DRAWINGS

FIG. 12 is a perspective view showing the projection lens from the rear side;

FIG. 13 are cross sections showing the projection lens of a first embodiment of the present invention, where

FIG. 14 are cross sections showing the projection lens of the present invention provided with a screw stick, where

FIG. 20 are cross sections showing a projection lens according to second embodiment of the present invention, where

DETAILED DESCRIPTION OF PREFERRED EMBODIMENT(S)

Preferred embodiments of the present invention will be described below with reference to attached drawings.

[1. Primary Arrangement of Projector]
[First Embodiment]

Figure 1:
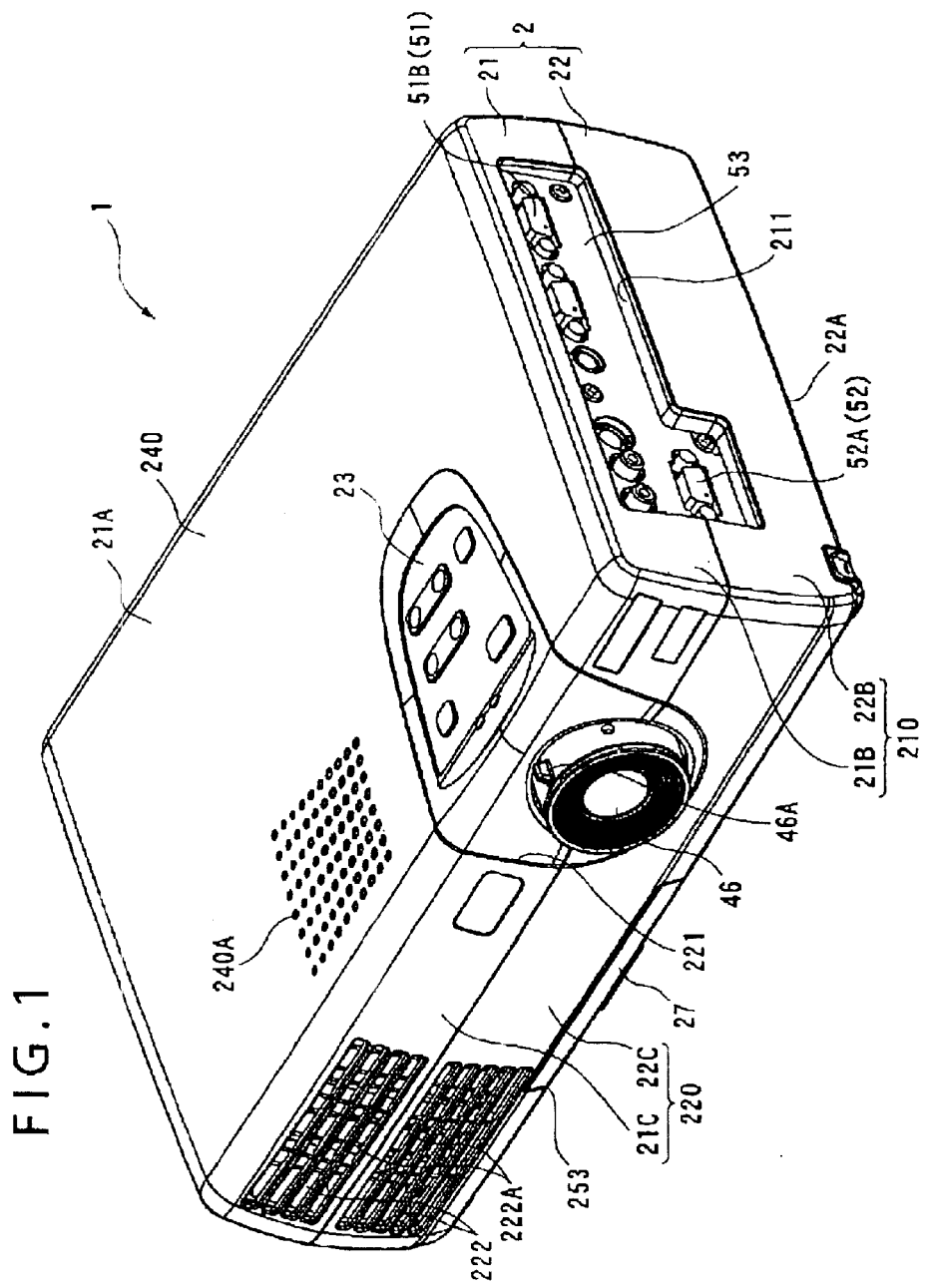
FIG. 1 is an entire perspective view showing a projector seen from upper front side thereof according to an embodiment of the present invention.
Figure 2:
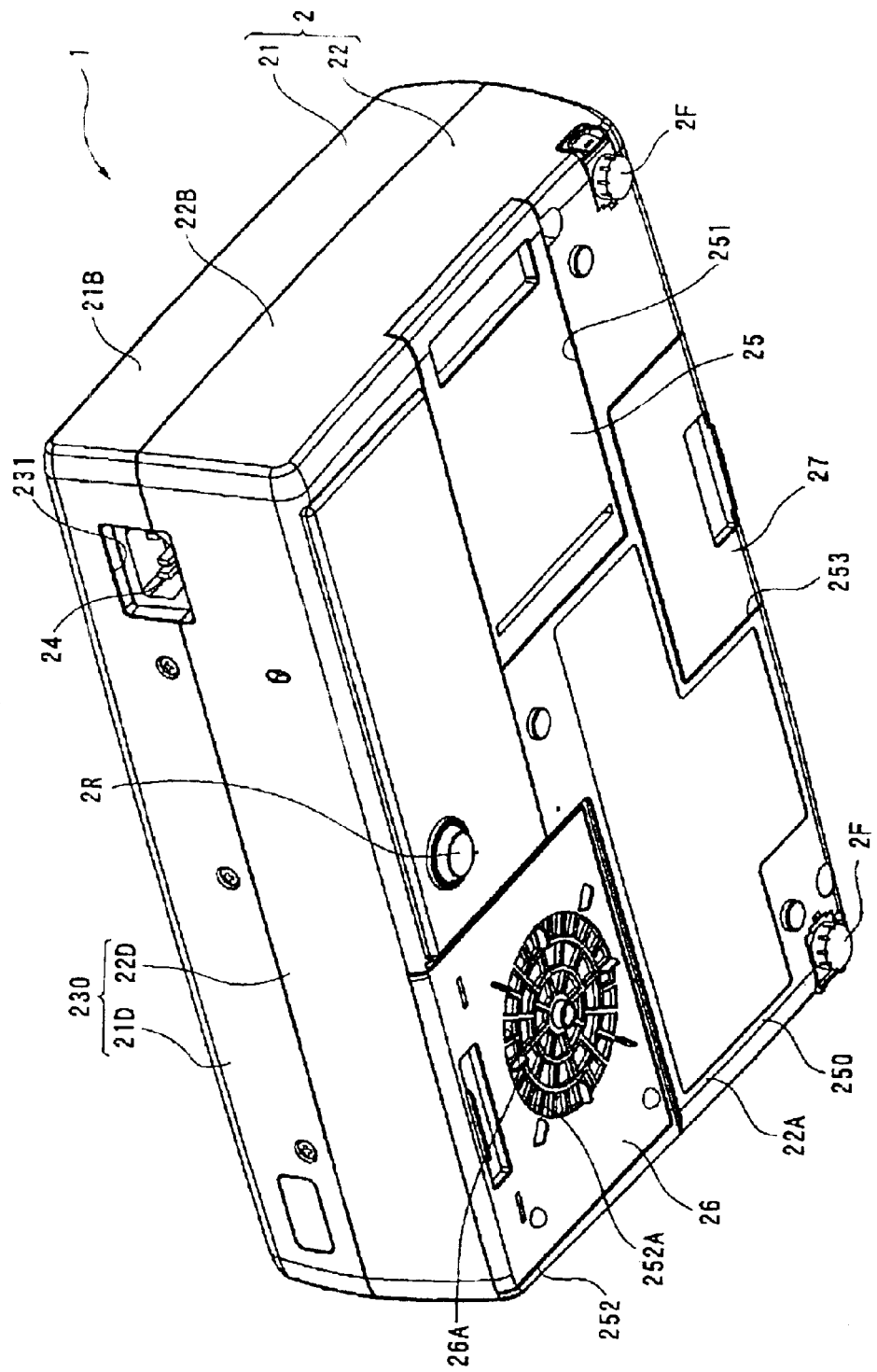
FIG. 2 is an entire perspective view showing the projector seen from lower rear side.

FIG. 1 is a perspective view of a projector 1 seen from upper front side according to an aspect of the present invention. FIG. 2 is a perspective view of the projector 1 seen from lower rear side.

As shown in FIGS. 1 and 2, the projector 1 has an approximately rectangular parallelepiped exterior case 2 made by injection molding. The exterior case 2 is a casing for accommodating a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D respectively constituting the upper side, lateral side, front side and rear side of the projector 1.

In the same manner, the lower case 22 includes a lower portion 22A, a lateral portion 22B, a front portion 22C and a rear portion 22D respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral side 210 of the rectangular parallelepiped exterior case 2. Similarly, the front portions 21C and 22C are connected to form a front side 220, the rear portions 21D and 22D are connected to form a rear side 230, the upper portion 21A forms an upper side 240 and the lower portion 22A forms a lower side 250.

As shown in FIG. 1, an operation panel 23 is provided on the front side of the upper side 240, and a sound-outputting speaker hole 240A is formed around the operation panel 23.

An opening 211 spanning over the two lateral portions 21B and 22B is formed on the lateral side 210 on the right side seen from front side. A below-described main board 51 and an interface board 52 are provided in the exterior case 2 and a connector 51B installed on the main board 51 and a connector 52A installed on the interface board 52 are exposed to the outside through an interface panel attached to the opening 211. Exterior electronics etc. are connected to the projector through the connectors 51B and 52A.

A circular opening 221 spanning between two front portions 21C and 22C is formed around the operation panel on the right side seen from the front side 220. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A as a part of the exposed portion.

An exhaust hole 222 is formed on the front side 220 opposite to the opening 221. A safety cover 222A is formed on the exhaust hole 222.

As shown in FIG. 2, a rectangular opening 231 is formed on the right side of the rear side 230 seen from rear side. An inlet connector 24 is exposed from the opening 231.

A rectangular opening 251 is formed at the center of the right end of the lower side 250 seen from bottom side. A lamp cover 25 covering the opening 251 is detachably attached to the opening 251. A non-illustrated light source lamp can be easily exchanged by detaching the lamp cover 25.

A rectangular surface 252 dented inward is formed on the left rear corner of the lower side 250 seen from bottom side. An intake 252A for drawing in cooling air from the outside is formed on the rectangular surface 252. An intake cover 26 covering the rectangular surface is detachably provided on the rectangular surface 252. An opening 26A corresponding to the intake 252A is formed on the intake cover 26. A non-illustrated air filter is provided on the opening 26A to prevent invasion of dust into the interior of the casing.

A rear leg 2R constituting one of the legs of the projector 1 is formed approximately at the center on the rear side of the lower side 250. Further, front legs 2F also constituting the legs of the projector 1 are respectively provided on the right and left corners on the front side of the lower side 250. In other words, the projector 1 is supported on three points by the rear leg 2R and the two front legs 2F.

The two front legs 2F is vertically advanceable and retractable, so that the inclination (attitude) of the projector 1 in front and back direction and right and left direction can be adjusted to adjust the position of the projection image.

Further, as shown in FIGS. 1 and 2, a rectangular parallelepiped recess 253 is formed approximately at the center of the front side of the exterior case 2 spanning over the lower side 250 and the front side 220. A cover 27 covering the lower side and front side of the recess 253 and slidable in front and back direction is provided on the recess 253. A non-illustrated remote controller for remotely controlling the projector 1 is accommodated in the recess 253 covered by the cover 27.

Figure 3:
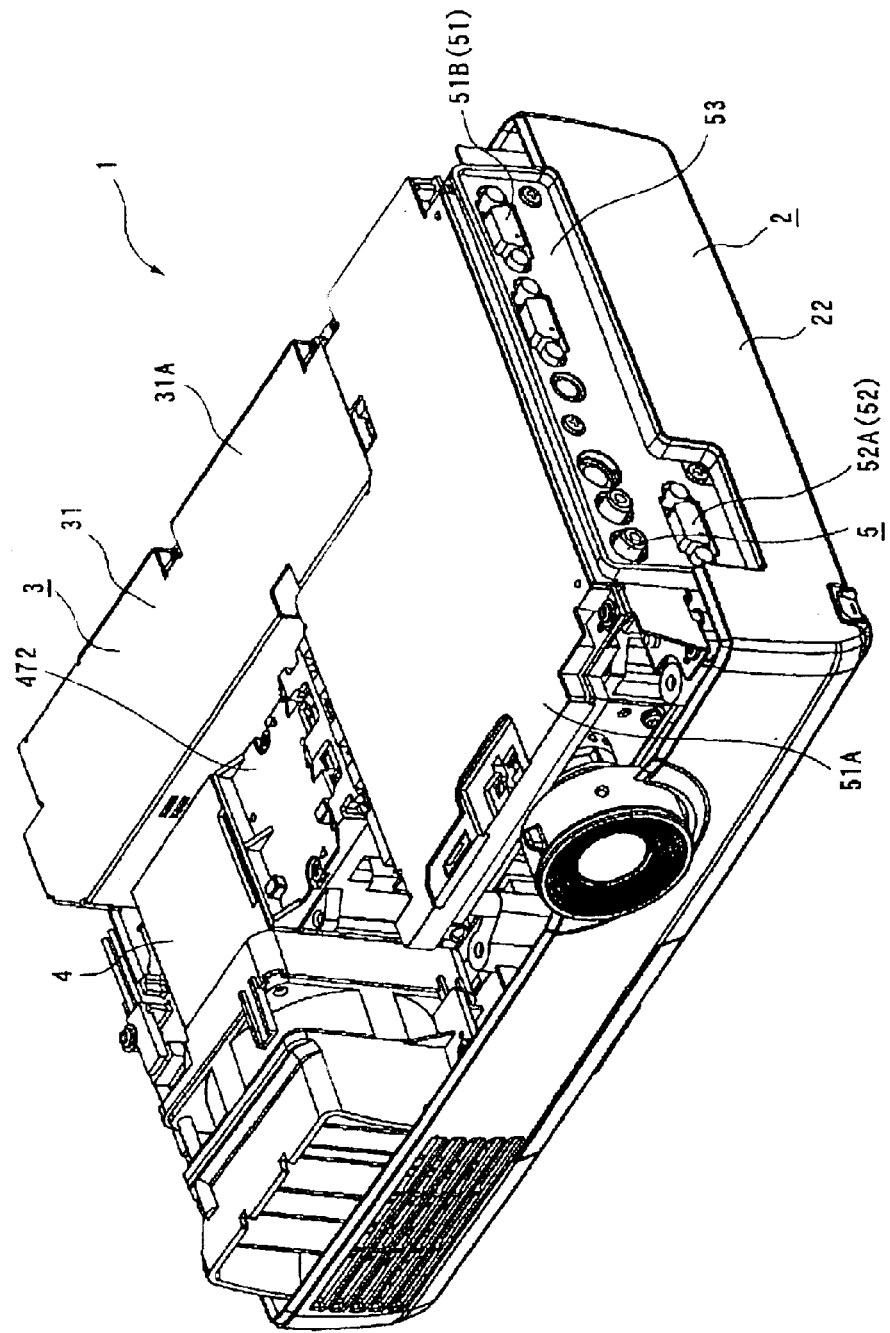
FIG. 3 is a perspective view showing the interior of the projector, which specifically shows the projector with an upper case thereof being removed from FIG. 1.
Figure 4:
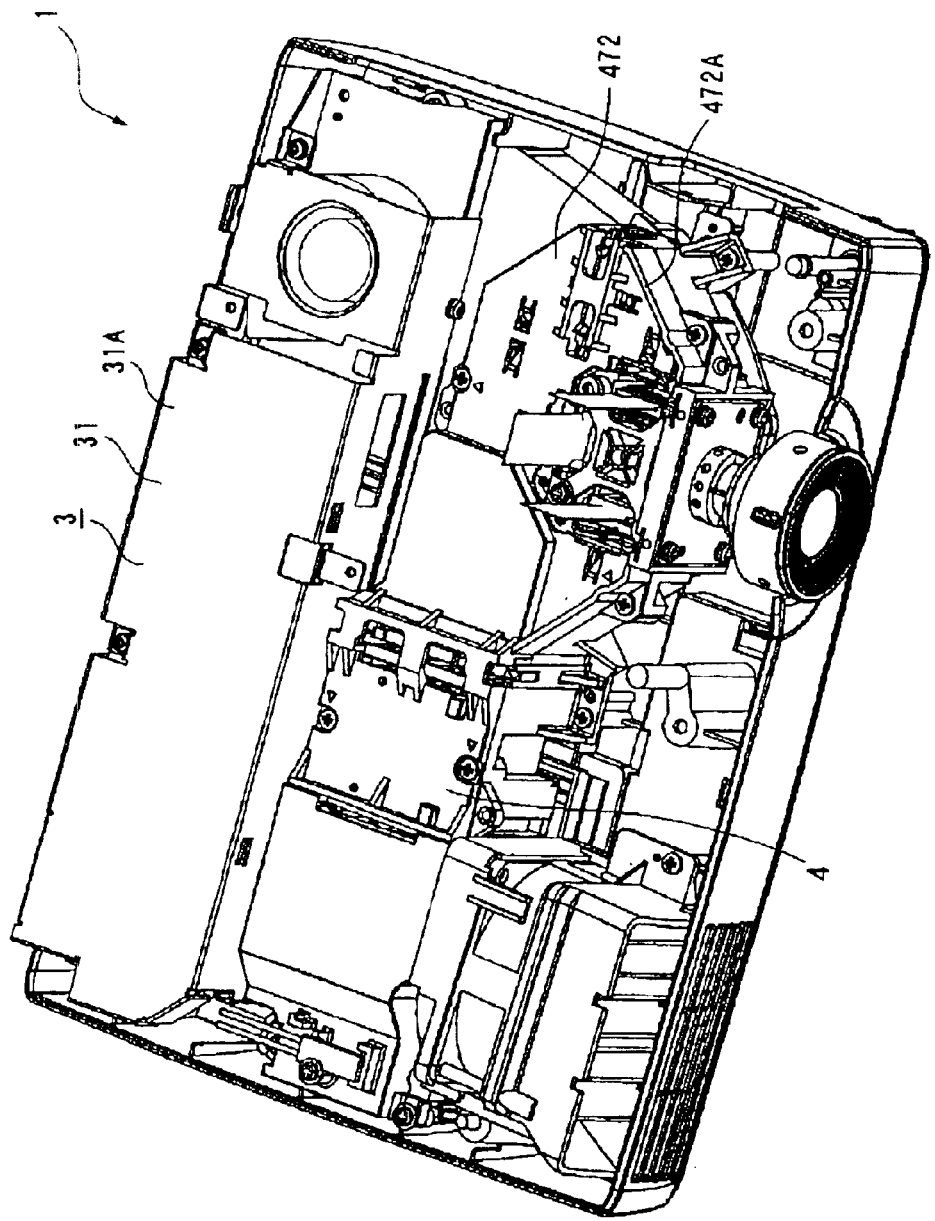
FIG. 4 is a perspective view showing the interior of the projector, which specifically shows a condition where a control board is removed from FIG. 3.

FIGS. 3 and 4 are perspective view showing the interior of the projector 1. Specifically, FIG. 3 is an illustration showing the upper case 21 being removed from FIG. 1. FIG. 4 is an illustration with a control board 5 being removed from FIG. 3.

As shown in FIGS. 3 and 4, the exterior case has a power source unit 3 disposed along the rear side and extending in right and left direction, an optical unit 4 disposed on the front side of the power source unit 3 as a planarly-viewed L-shaped optical system and the control board S as a controller disposed on the upper right side of the units 3 and 4. The components 3 to 5 constitute the primary portion of the projector 1.

The power source unit 3 has a power source 31 and a non-illustrated lamp driving circuit (ballast) disposed below the power source 31.

The power source 31 supplies the electric power from the outside to the lamp driving circuit, the circuit board 5 etc. through a non-illustrated power cable connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in right and left direction on the rear side of the projector 1.

The surroundings of the power source 31 and the lamp driving circuit are covered with a metal shield 31A such as aluminum with right and left sides thereof being opened The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel of the below-described optical device in accordance with the image information inputted through the connectors 51B and 52A.

The surroundings of the main board 51 is covered with a metal shield 51A. Though not clearly shown in FIG. 3, the main board 51 abuts to an upper end 472A of an upper light guide 472 of the optical unit 4.

[2. Detailed Construction of Optical Unit]

Figure 5:
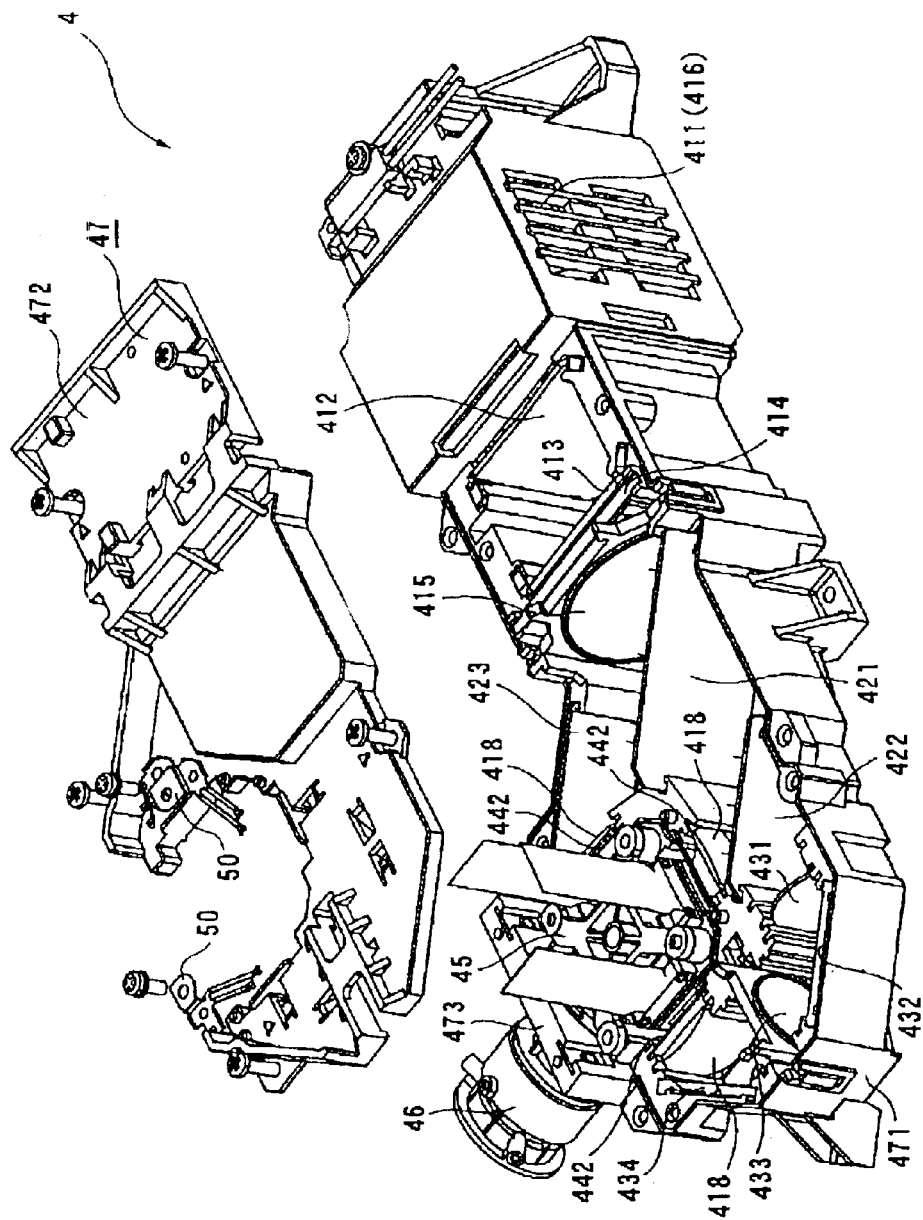
FIG. 5 is an exploded perspective view showing an optical unit of the projector.
Figure 6:
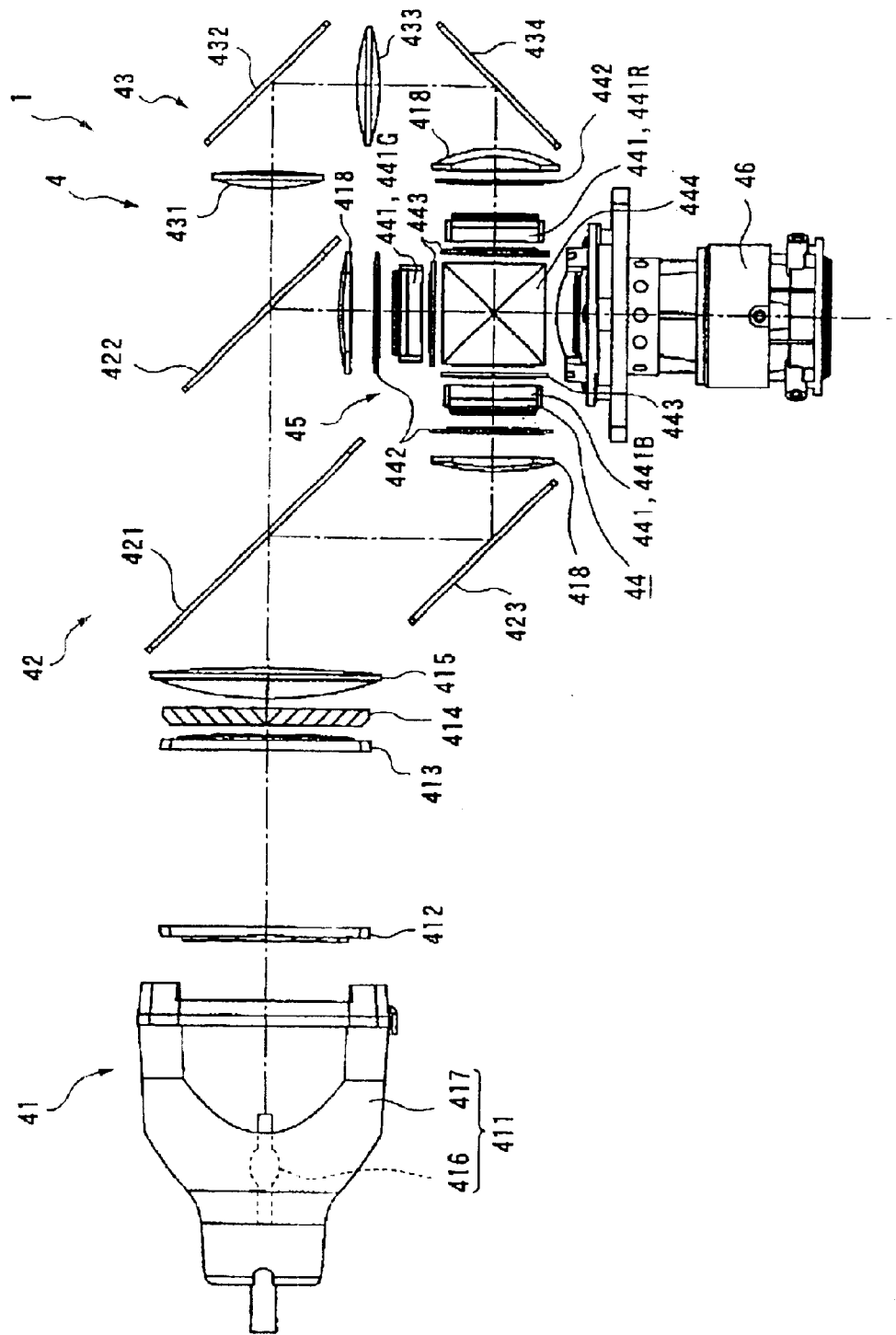
FIG. 6 is a schematic illustration of the optical unit.

FIG. 5 is an exploded perspective view showing the optical unit 4. FIG. 6 is a schematic illustration of the optical unit 4.

As shown in FIG. 6, the optical unit 4 is a unit for optically process the light beam irradiated by a light source lamp 416 of a light source 411 to form an optical image corresponding to the image information and project the optical image in an enlarged manner, which includes an integrator illuminating optical system 41, a color separating optical system 42, a relay optical system 43, an optical device 44, the projection lens 46 as a projection optical system, and a light guide 47 made of synthetic resin for accommodating the optical components 41 to 44 and 46 (FIG. 5).

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes the light source 411, a first lens array 412, a second lens array 413, a polarizer 414 and a superposing lens 415.

The light source 411 has the light source lamp 416 as a radiation light source and a reflector 417, which changes the radial light beam irradiated by the light source lamp 416 into a parallel light beam by the reflector 417 to emit the parallel light beam toward the outside. A high-pressure mercury lamp is used as the light source lamp 416. Incidentally, metal halide lamp and a halogen lamp etc. may be used instead of the high-pressure mercury lamp. A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarizer 414 is disposed between the second lens array 413 and the superposing lens 415. The polarizer 414 converts the light from the second lens array 413 to uniform polarized light in order to enhance light utilization efficiency in the optical device 44.

Specifically, the respective sub-beams converted into single polarized light by the polarizer 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarizer 414, all of the light emitted from the light source lamp 416 is converted into single polarized light to enhance light utilization efficiency in the optical device 44. Incidentally, such polarizer 414 is disclosed in, for instance, Japanese Patent Laid-Open Publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441R function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc. Incidentally, polarization film may be formed on the field lens 418 without employing the substrate.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam. Incidentally, polarization film may be formed on the cross dichroic prism 444 without employing substrate.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

Figure 7:
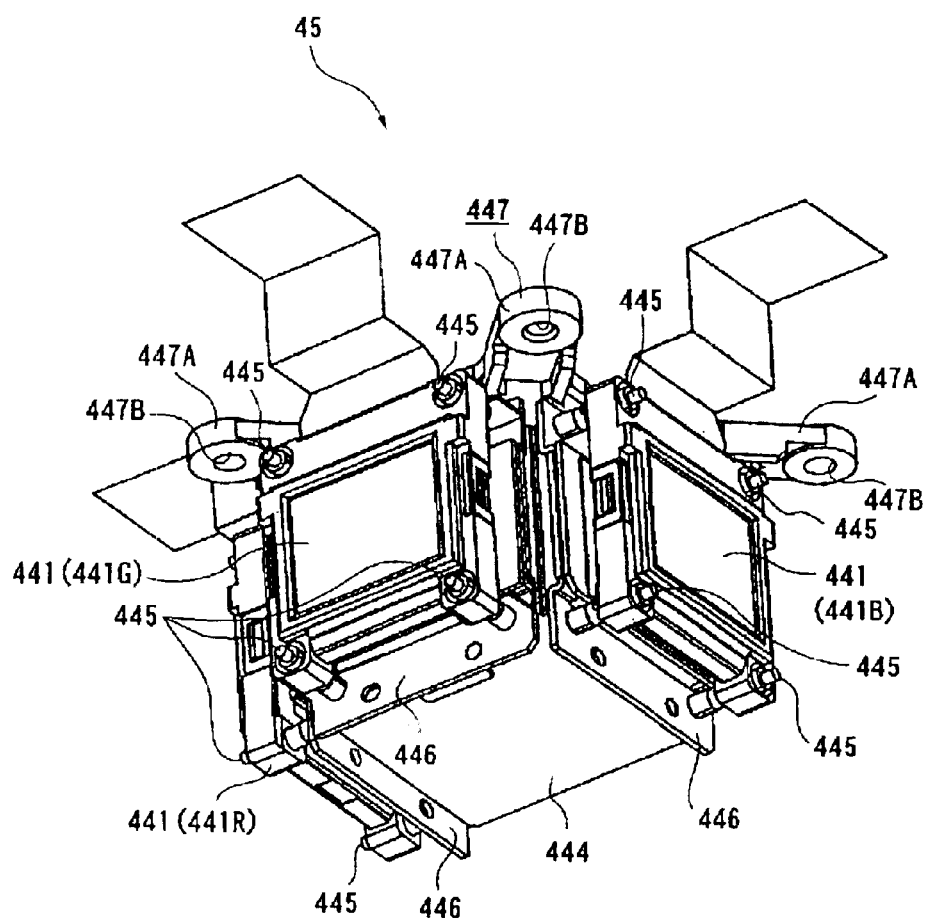
FIG. 7 is a perspective view showing an optical device body of the optical unit.

The above-described liquid crystal panels 441, the irradiation-side polarization plate 443 and the cross dichroic prism 444 are constructed as an integrated unit of optical device body 45. FIG. 7 is a perspective view showing the optical device body 45.

As shown in FIG. 7, the optical device body 45 has the cross dichroic prism 444, a fixing plate 447 made of synthetic resin and fixed on the upper side of the cross dichroic prism 444, a metal holding plate 446 attached to the light-incident side of the cross dichroic prism 444 for holding the irradiation-side polarization plate 443, and the liquid crystal panels 441 (441R, 441G and 441G) held by four pins 445 made of transparent resin attached to the light-incident side of the holding plate 446.

A predetermined gap is secured between the holding plate 446 and the liquid crystal panel 441, so that the cooling air can flow through the gap.

The optical device body 45 is screwed to the lower light guide 471 through a circular hole 447B of four arms 447A formed on the fixing plate 447.

The projection lens 46 enlarges and projects the color image combined by the cross dichroic prism 444 of the optical device 44.

As shown in FIG. 5, the light guide 47 has the lower light guide 471 having a groove on which the optical components 412 to 415, 418, 421 to 423, 431 to 434 and 442 are slidably fitted from the above, and a lid-shaped upper light guide 472 for closing the upper opening of the lower light guide 471.

As shown in FIG. 5, the light source 411 is accommodated on a side of the lower light guide 471 of approximately planarly-viewed L-shape. The projection lens 46 is screwed to the other end of the lower light guide 471 through a head component 473 formed on the lower light guide 471. The details of the projection lens 46 will be described below.

As shown in FIG. 5, the optical device body 45 accommodated in the lower light guide 471 is screwed to the lower light guide 471 with two springs 50 being sandwiched. The two springs 50 bias the field lens 418 and the incident-side polarization plate 442 toward lower side to fix the position thereof.

[3. Cooling Mechanism]

Figure 8:
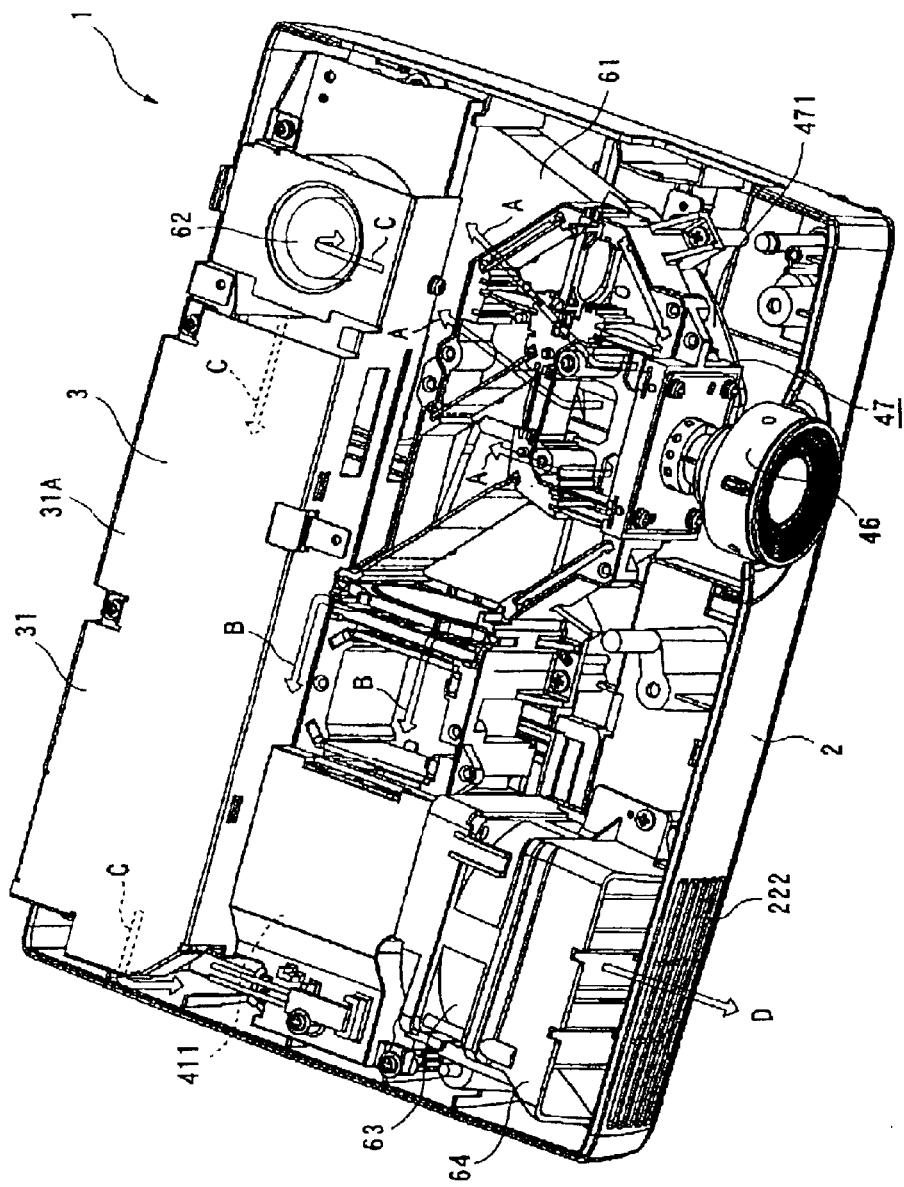
FIG. 8 is a perspective view showing an interior cooling system of the projector, which specifically shows that an upper light guide and the optical device body are removed from FIG. 4 to show the cooling system.
Figure 9:
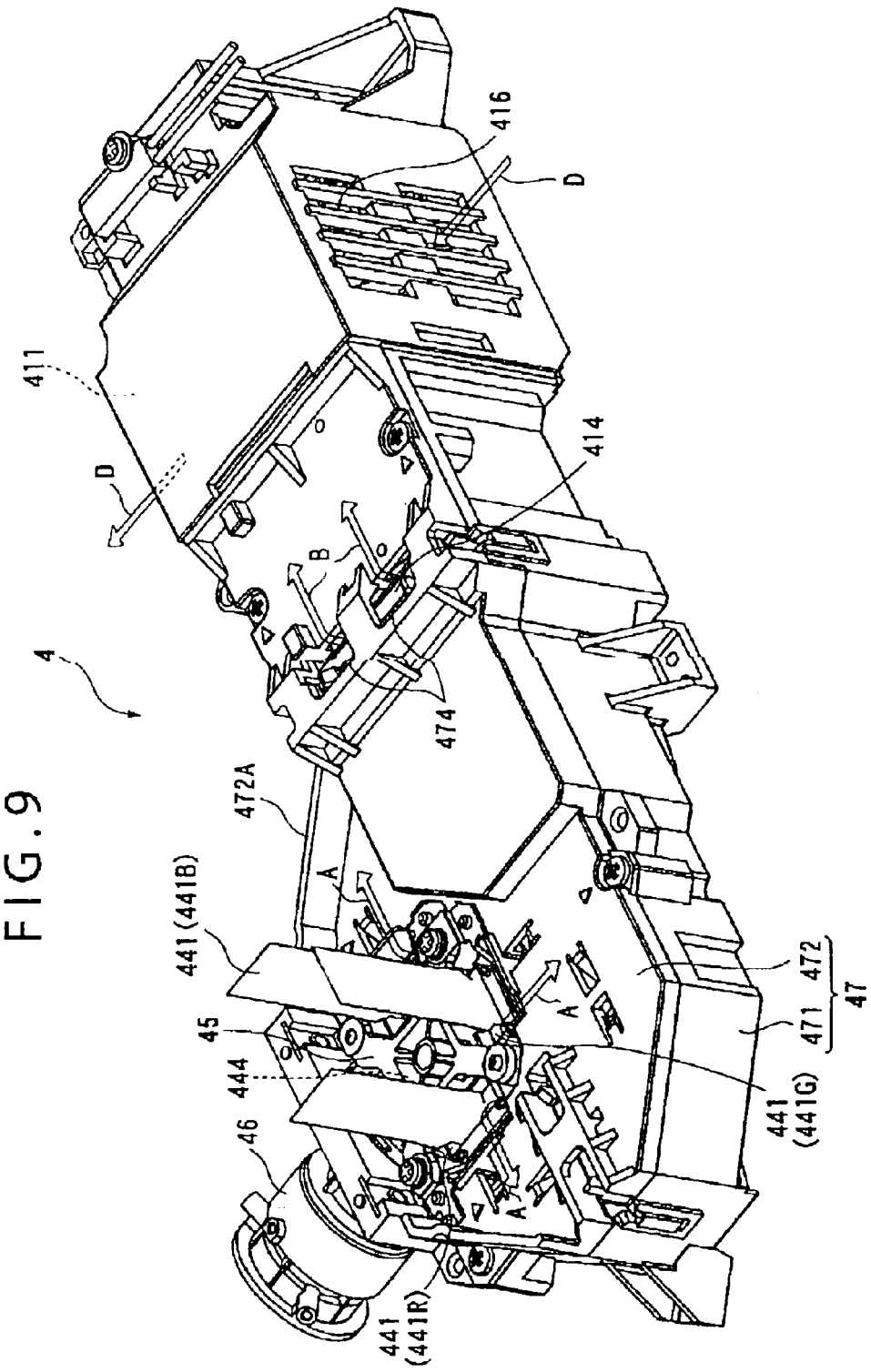
FIG. 9 is a perspective view showing the cooling system of the optical unit.

FIG. 8 is an illustration removing the upper light guide 472 and the optical device body 45 from FIG. 4. FIG. 9 is a perspective view showing the optical unit 4.

As shown in FIGS. 8 and 9, the projector 1 has a panel cooling system A mainly for cooling the liquid crystal panel 441, a polarizer cooling system B mainly for cooling the polarizer 414, a power source cooling system C mainly for cooling the power source unit 3, and a light source cooling system D mainly for cooling the light source 411.

As shown in FIG. 8, a large sirocco fan 61 disposed on the lower side of the power source unit 3 is used in the panel cooling system A.

In the panel cooling system A, as shown in FIGS. 8 and 9, the outside cooling air introduced from the intake (FIG. 2) formed on the lower side 250 of the exterior case 2 is guided to the lower side of the optical device body 45 by the sirocco fan 61 through a non-illustrated duct, which enters into the light guide 47 from the intake formed on the lower side of the respective liquid crystal panels 441 of the lower light guide 471. As shown in FIG. 9, the cooling air passes through the gap between the respective liquid crystal panels 441R, 441G and 441B and the cross dichroic prism 444 to cool the liquid crystal panel 441 and the irradiation-side polarization plate to be discharged to the space between the upper light guide 472 and the control board 5. Further, the cooling air passes through the gap between the respective liquid crystal panels 441R, 441G and 441B and the field lens 418 to cool the liquid crystal panel 441 and the incident-side polarization plate 442 to be discharged to the space between the upper light guide 472 and the control board S.

Incidentally, the air discharged to the spaces is prevented from flowing toward the projection lens 46 by the contact of the upper end 472A of the upper light guide 472 and the control board 5.

The cooling air drawn in by the sirocco fan 61 is introduced to the lower side of the polarizer 414 by a non-illustrated duct disposed on the lower side of the lower light guide 471, which enters into the light guide 47 from the intake formed on the lower side of the polarizer 414 of the lower light guide 471 to cool the polarizer 414 to be discharged from an exhaust hole 474 formed on the upper light guide 472.

A small sirocco fan 62 disposed on the upper side of the sirocco fan 61 sandwiching a metal plate is used in the power source cooling system C as shown in FIG. 8.

In the power source cooling system C, the cooling air flowing into the space between the upper light guide 472 and the control board 5 by the panel cooling system A is drawn in by the sirocco fan 62 while cooling the control board 5 to be discharged into the power source unit 3. The air discharged into the power source unit 3 flows along the shield 31A to cool the power source 31 and the lamp driving circuit to be discharged from an opening opposite to the sirocco fan 62.

The light source cooling system D uses an axial-flow fan 63 disposed on the front side of the light source 411 and a duct 64 attached to the axial-flow fan 63.

In the light source cooling system D, the air discharged by the power source cooling system C and the polarizer cooling system B enters into the light source 411 from the slit-shaped opening formed on the lateral side of the light source 411 being drawn by the axial-flow fan 63 to cool the light source lamp 416 and is discharged from the exhaust hole 222 of the exterior case 2 toward the outside through the duct 64.

[4. Projection Lens]

(Structure of Projection Lens)

Figure 10:
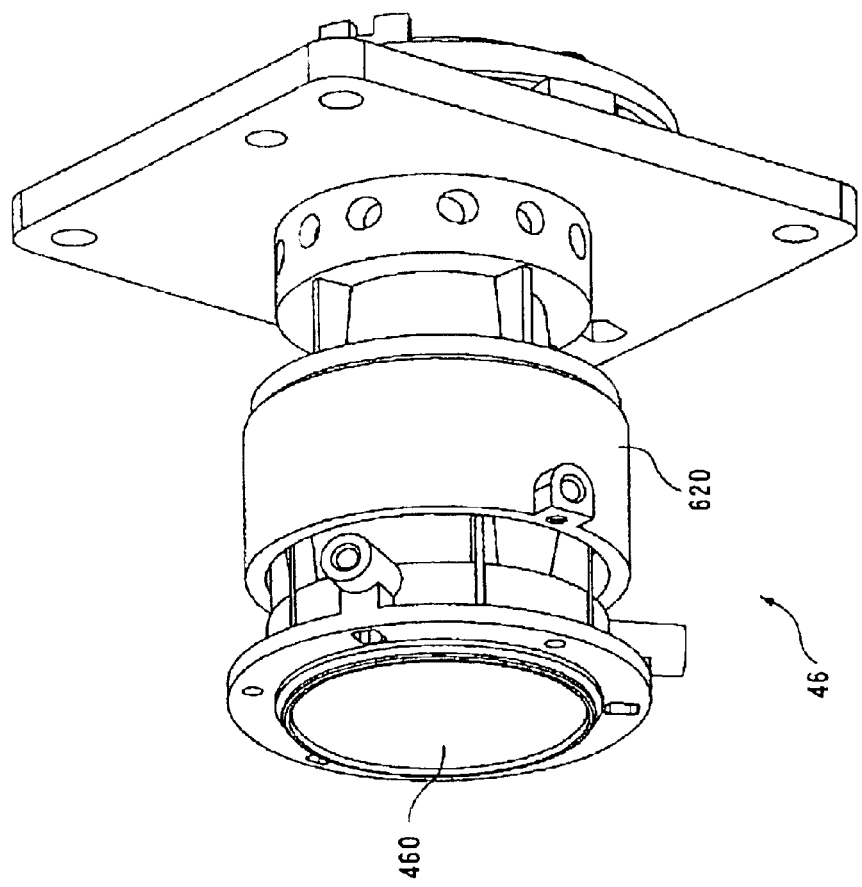
FIG. 10 is a perspective view showing a projection lens of the projector from a projection side.
Figure 11:
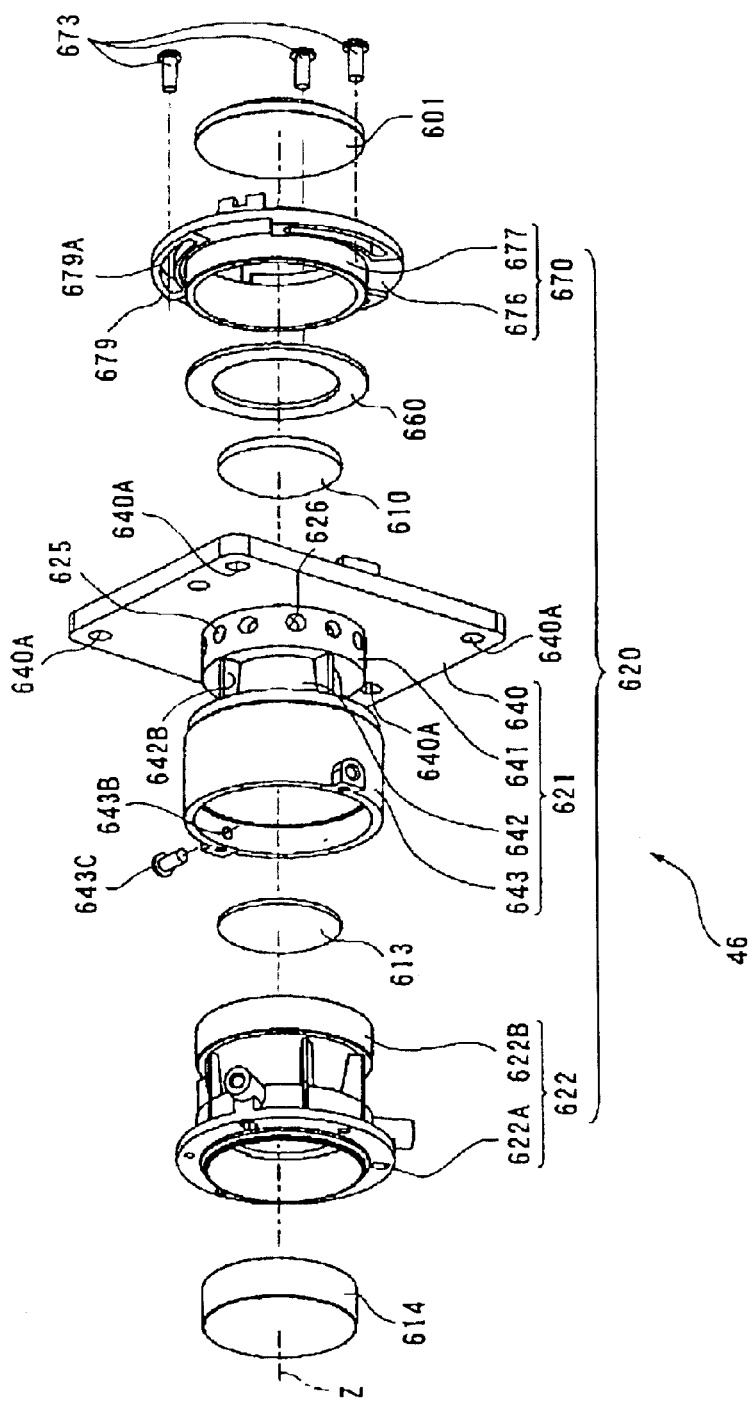
FIG. 11 is an exploded perspective view showing the projection lens.

FIG. 10 is a perspective view showing the projection lens 46 from the front (projection) side. FIG. 11 is an exploded perspective view showing the projection lens 46. FIG. 12 is a perspective view showing the projection lens 46 from the rear side. FIG. 13 are cross sections showing the projection lens according to first embodiment of the present invention, where FIG. 13A is an entire view and FIG. 13B is a partly enlarged view thereof.

As shown in FIG. 6, the projection lens 46 enlarges and projects the color image combined by the cross dichroic prism 444 of the optical device body 45.

As shown in FIG. 10, the projection lens 46 has a resin-made exterior case 620 in which a predetermined optical path is set, and a group lens 460 composed of a plurality of lenses sequentially arranged on the illumination optical axis of the optical path in the exterior case 620.

Figure 13A:
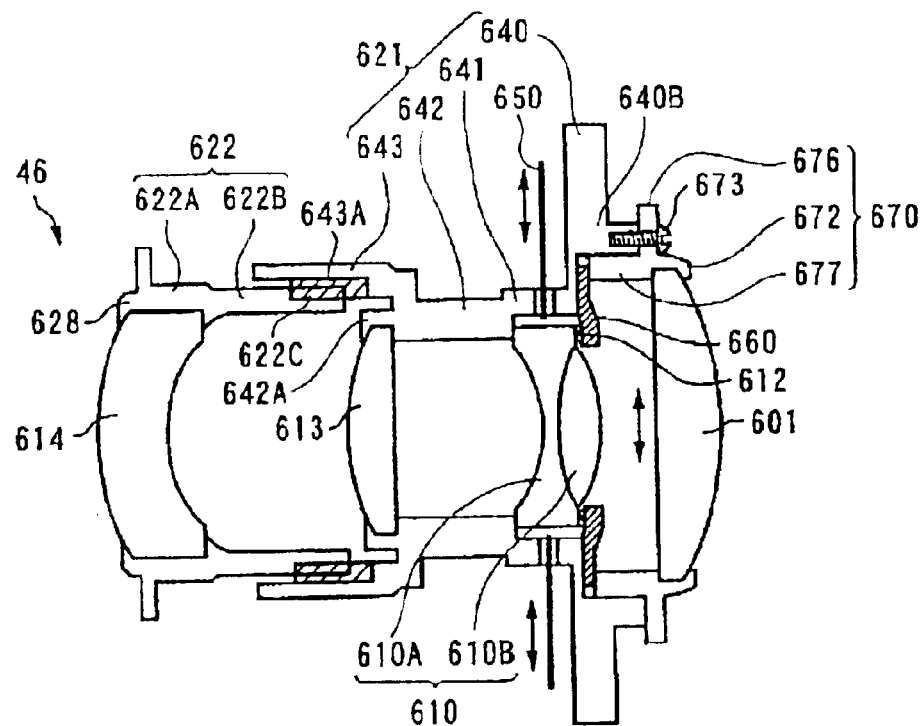
FIG. 13A is an entire view and FIG. 13B is a partly enlarged view thereof.
Figure 13B:
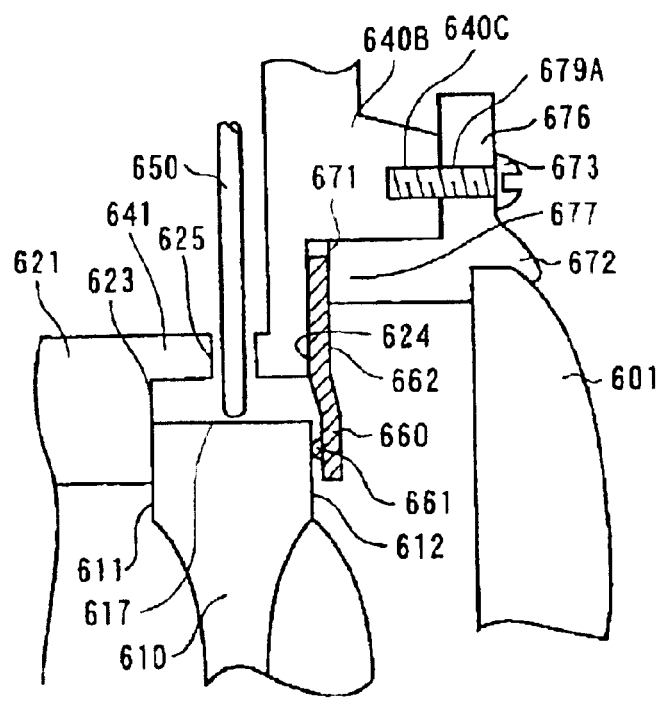

As shown in FIGS. 11 and 13A, the group lens 460 is composed of total four group lens, i.e. a fourth group lens 614, a third group lens 613, a second group lens 610 and a first group lens 601 from the projection side (left side in the figure).

The fourth group lens 614 is a concave lens for enlarging and projecting the optical image, which is an aspherical lens. The third group lens 613 is a convex lens for adjusting the light beam. The second lens 610 is a balsam lens composed of a concave lens 610A and a convex lens 610B adhered on the concave lens 610A, the convex lens 610B having smaller dimension than the concave lens 610A and aspherical lens on the irradiation side. The first group lens 601 is a convex spherical lens on which the image light is irradiated.

After the image light irradiated by the cross dichroic prism 444 is incident on the spherical first group lens 601, the chromatic aberration of the image light is corrected by the second group lens 610 as the balsam lens and light amount is adjusted by the third group lens 613, of which distortion is corrected by the aspheric fourth group lens 614 to be irradiated toward the outside in an enlarged manner.

As shown in FIGS. 11 and 13A, the exterior case 620 has a first exterior case 621 as a lens holding cylinder fixed on an end of the lower light guide, a second exterior case 622 attached to the projection side (left side in the figure) of the first exterior case 621, and a retainer 670 attached to the side opposite to the projection side of the first exterior case 621 (right side in the figure). The second exterior case 622 is slidably provided on the first exterior case 621. The axes of the first exterior case 621, the second exterior case 622 and the retainer 670 are aligned.

The first exterior case 621 is a component made of synthetic resin for accommodating the second group lens 610 to be adjusted at a predetermined position, which includes a flat collar 640 screwed to an attachment side of the lower light guide 471 (FIG. 4), a cylindrical attitude adjuster 641 formed on the projection side of the collar 640, and a cylindrical attachment 643 formed on the projection side of the attitude adjuster 641 through a connector 642 and having a greater diameter than the diameter of the attitude adjuster 641.

The collar 640 is a rectangular plate component attached to the attachment surface of the lower light guide 471 to connect the lower light guide 471 and the projection lens 46.

An opening is formed on the plate-shaped collar 640, which penetrates the right and left sides in the figure to pass the image light As shown in FIG. 11, an insert screw hole 640A for attachment with the lower light guide 471 is formed on the four corners of the plate-shaped collar 640.

As shown in FIGS. 11 and 13, the attitude adjuster 641 loosely accommodates the second group lens 610.

The details of the stopper of the second group lens 610 will be described below.

The connector 642 is a cylindrical component connecting the attitude adjuster 641 and the attachment 643, which is formed in a diameter smaller than the diameter of the attitude adjuster 641 and the attachment 643.

As shown in FIG. 13A, a lens holding claw 642A for the third group lens 613 to be fitted is formed on the left side (in the figure) of the connector 642. The third group lens 613 is attached in the lens holding claw 642A by thermally caulking. The lens holding claw 642A is formed so that the center of the third group lens 613 is accurately positioned on the optical axis Z with reference to the outer profile of the third lens 613.

A rib 642B (FIG. 11) for reinforcing the connection between the attitude adjuster 641 and the attachment 643 is formed on a position on the outer circumference of the connector 642 corresponding to a below-described lens-shifting through-hole 625.

The attachment 643 is a cylinder formed on the left side of the connector 642 in the figure bulging toward the outer circumference thereof, which holds the second exterior case 622 on the left side in FIG. 11. An female thread 643A is formed on the inner circumference of the attachment 643.

A screw insert hole 643B is formed on the upper side of the attachment 643 in the FIG. 11. A screw 643C is inserted to the screw insert hole 643B so that the distal end thereof protrudes toward the inside of the attachment 643. Unnecessary rotation of the second exterior case 622 can be prevented by the screw.

The second exterior case 622 is a cylindrical frame, which includes a lens holder 622A and a connector 622B attached to the attachment 643. Incidentally, though not shown in FIG. 11, a decorative cover provided with the lever 46A is provided to cover the outer circumference of the connector 622B as shown in FIG. 4.

As shown in FIG. 13A, the lens holder 622A is a frame on which a lens-holding claw 638 for the fourth group lens 614 to be fitted is formed, the fitted fourth group lens 614 being thermally caulked. The lens holder 622A is formed so that the center of the fourth group lens 614 is accurately positioned on the optical axis Z with reference to the outer profile of the fourth group lens 614.

The connector 622B is inserted to the inside of the attachment 643. An male thread 622C screwed to the female thread 643A is formed on the outer circumference of the connector 622B. The female thread 643A and the male thread 622C are screwed to advance and retract the second exterior case 622 in a direction along the optical axis Z relative to the attachment 643. Accordingly, the focus of the projected image can be adjusted.

As shown in FIGS. 11 and 13A, the retainer 670 has a disc-shaped flange 676 having an approximately circular opening at the center thereof, a projection 677 cylindrically projecting from the outer circumference of the opening toward left side in the figure, and a fixing claw 672 provided on the right side (in the figure) of the outer circumference of the opening. As shown in FIG. 13, the fixing claw 672 is a flame for the first group lens 601 to be fitted, the fitted first group lens 601 being thermally caulked The fixing claw 672 is formed so that the center of the first group lens 601 is accurately positioned on the optical axis Z with reference to the outer profile of the first group lens 601.

The flange 676 is connected to the projection 640B of the collar 640 of the first exterior case 621.

As shown in FIGS. 11 and 12, an adjuster 679 projecting toward left side is formed on three positions on the left side (in the figure) of the flange 676 at an approximately constant interval along the circumference. The adjusters 679 are gentle slant surface of which inclination is substantially aligned. Accordingly, the retainer body 676 is capable of advancement and retraction along the optical axis Z by rotating around the optical axis Z for the amount of projection by the inclination relative to the collar 640, thereby conducting focus adjustment.

A loose hole 679A penetrating the flange 676 in the right and left direction is formed along the profile of the adjuster 679. A fixing screw 673 is inserted to the loose hole 679A and the retainer 670 is fixed on the first exterior case 621 being connected to the screw hole 640C of the collar 640. The projection 677 is inserted to the recess of the collar 640 to hold the second group lens 610 through a concentric spacer 660 by biasing toward the left side (in the figure). The spacer 660 abuts only to the right side of the outer circumference of a side 612 of the second group lens 610 and the convex lens 610B of the second group lens 610 is located inside the opening of the spacer 660.

Incidentally, an adhesive may be coated on the stopper of the group lens.

(Lens Attitude Adjuster)

As shown in FIG. 13B, a first step 623 and a second step 624 are provided on the inner circumference of the first exterior case 621. The first step 623 and the second step 624 are surfaces parallel to a plane perpendicular to the axis of the first exterior case 621 (referred to as X-Y plane hereinafter). A plurality (four, in the present embodiment) lens-shifting through-holes 625 are evenly arranged approximately at ninety degrees along the outer circumference of the attitude adjuster 641 on the side of the attitude adjuster 641 of the first exterior case 621 in a plane parallel to the X-Y plane (the parallel plane may be referred to as X-Y plane hereinafter) corresponding to the fixed position of the second group lens 610.

A side 611 of the lens 610 is slidably abutted to the first step 623 and a spacer projection 661 of the spacer 660 is pressed on the other side 612 in a slidable manner. An entire circumference of a backside 662 of the spacer 660C i.e. the side having no spacer projection 661) is held by being pressed to a press surface 671 of the retainer 670. In other words, the spacer 660 is flexible or elastic and the spacer projection 661 is formed in a circle, the side 612 and the spacer 660 (the spacer projection 661, strictly speaking) are contacted at a band of predetermined width, so that the outer periphery of the lens 610 is stably supported in a balanced manner, without shakiness and in a manner capable of parallel movement (shift).

Since the thickness of the outer periphery of the lens 610 (i.e. the distance between the sides 611 and the 612) is greater than the distance between the steps of the exterior case (the distance between the first step 623 and the second step 624), when the spacer 660 is fixed on the second step 624 by the retainer 670, the spacer 660 is bent (i.e. elastically deformed) to press the lens 610.

(Lens-Shift Adjusting Stick)

As described above, since the second group lens 610 is slidably pressed in parallel to the X-Y plane through the spacer projection 661 of the spacer 660 (vertical direction in FIG. 13B), the lens 610 is easily shifted (vertically moved in FIG. 13B) without being tilted by pressing an outer surface 617 of the lens 610 by a lens-shift adjusting stick 650 as a lens-shift adjuster in vertical direction in FIG. 13B.

Specifically, the lens-shift adjusting stick 650 is inserted to the lens-shifting through-hole 625 corresponding to the direction for the lens to be shifted in the X-Y plane and the tip end of the lens-shift adjusting stick 650 is brought into contact with the outer surface 617 of the lens 610. The lens 610 can be shifted at a desired position by advancing the lens-shift adjusting stick 650 for a predetermined distance.

After completing the shift adjustment, the lens-shift adjusting stick 650 is removed. At this time, the lens 610 is not moved by being pressed and held through the spacer projection 661 of the spacer 660. Accordingly, after removing the lens-shift adjusting stick 650, the lens 610 can be fixed by injecting an adhesive (such as ultraviolet-curing type) through the lens-shifting through-hole 625.

Incidentally, adhesive may be injected to the lens-shifting through-hole 625 in which no lens-shift adjusting stick 650 is inserted while at least one of the lens-shift adjusting sticks 650 is not removed. Alternatively, adhesive injection holes 626 may be provided on the attitude adjuster 641 between the lens-shifting through-holes 625 and the adhesive may be injected without removing the lens-shift adjusting stick 650. The adhesive may be photo-curing adhesive, cyano-type instant adhesive or thermosetting adhesive.

The shift-adjustment can be facilitated on account of the simple operation and, since the once-positioned lens is not moved, high-quality projection lens on which the shift is adjusted with a simple construction can be obtained.

Incidentally, there is no limitation on the number of the lens-shifting through-hole 625 and the lens-shift adjusting stick 650 and the lens-shift adjusting stick 650 may be inserted for each lens-shifting through-hole 625 for advancement and retraction.

Alternatively, after inserting the lens-shift adjusting stick 650 into a lens-shifting through-hole 625 in one direction for advancing the lens, the lens-shift adjusting stick 650 may be inserted into another lens-shifting through-hole 625 to advance the lens.

Further alternatively, a pair of lens-shift adjusting stick 650 may be inserted into a pair of lens-shifting through-holes 625 extending in predetermined directions (arranged in V-shape) for cooperatively advancing the lens.

It is not restricted to construct the projection lens 46 of four group lenses, and the number of the respective group lenses is not limited to one or two. Further, the lens having the shifting function is not limited to the second group lens (lens 610). The exterior case may be constructed by more than two cylinders.

(Lens-Shifting Screw Stick)

Figure 14A:
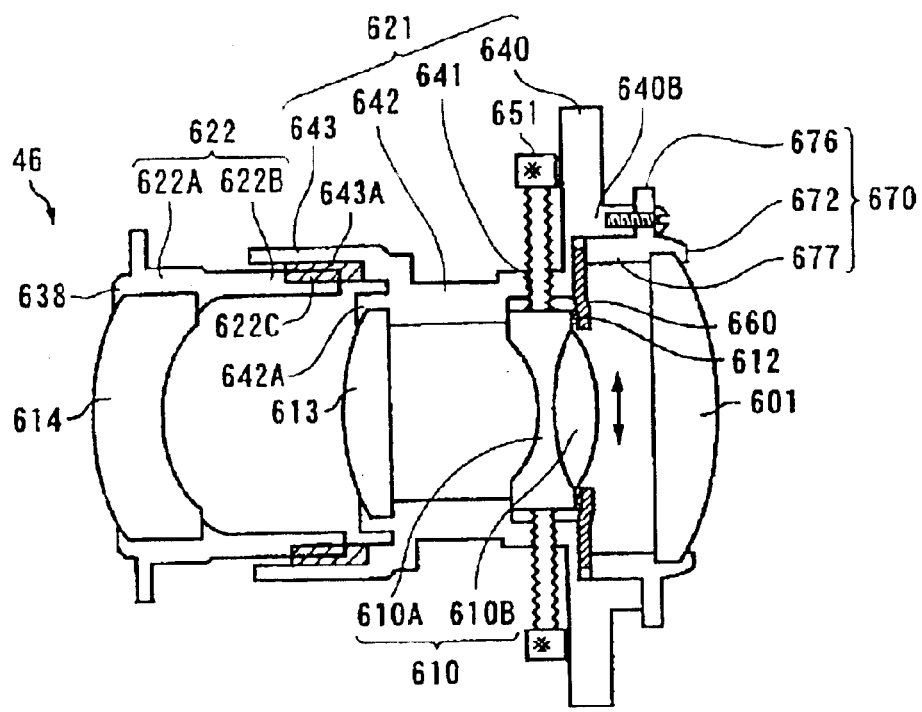
FIG. 14A is an entire view and FIG. 14B is a partly enlarged view thereof.
Figure 14B:
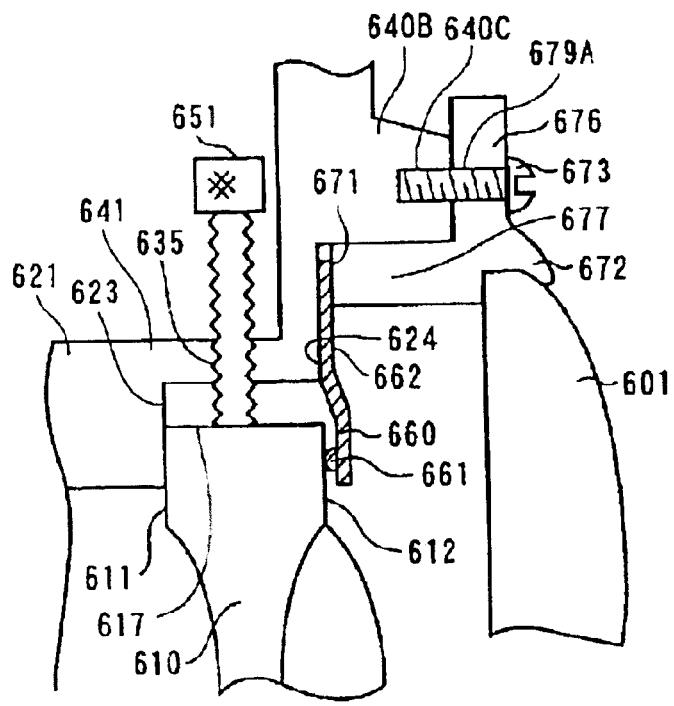

FIG. 14 is a cross section showing the projection lens 46 of the first embodiment of the present invention with a lens-shifting screw stick 651 as a lens-shift adjuster being mounted. In FIG. 14B, the first step 623 and the second step 624 are provided on the inner circumference of the first exterior case 621. The first step 623 and the second step 624 are parallel to a plane perpendicular to the axis of the exterior case 621 (referred to as X-Y plane hereinafter). A lens-shifting screw hole 635 arranged at even pitch in a plane parallel to the X-Y plane corresponding to the fixed position of the second group lens 610 (the parallel plane may be referred to as X-Y plane hereinafter) is screwed on the side of the exterior case 621. Incidentally, the same reference numeral will be attached to the same components as FIG. 13 to omit a part of explanation thereof.

The lens 610 is easily shifted by pressing the outer surface 617 of the lens 610 slidably held in parallel to the X-Y plane through the spacer 660.

Specifically, the lens-shifting screw stick 651 is screwed in the lens-shifting screw hole 635 corresponding to the direction to be shifted and the tip end of the lens-shifting screw stick 651 is abutted to the outer surface 617 of the lens 610. Then, the lens-shifting screw stick 651 is rotated by a predetermined angle to advance the screw stick to shift the lens 610 at a desired position.

After completing the shift movement, the lens-shifting screw stick 651 is removed. At this time, the lens 610 does not move since the lens 610 is pressed and held through the spacer 660. Accordingly, the lens can be fixed after removing the lens-shifting screw stick 651.

The shift amount can be minutely adjusted by changing the rotary angle of the lens-shifting screw stick 651 with a simple operation, the projection lens of higher quality can be produced.

Incidentally, there is no limitation in the number of the lens-shifting screw hole 635 and the lens-shifting screw stick 651 and the number of the both components may not be the same. For instance, a plurality of lens-shifting screw hole 635 may be evenly located on a plurality of positions on the circumference and the lens-shifting screw stick 651 may be screwed to the respective lens-shifting screw holes 635, or, alternatively, the lens-shifting screw stick 651 may be screwed to one or two lens-shifting screw holes 635 corresponding to the directions for the lens to be shifted.

(Case Projection)

Figure 15A:
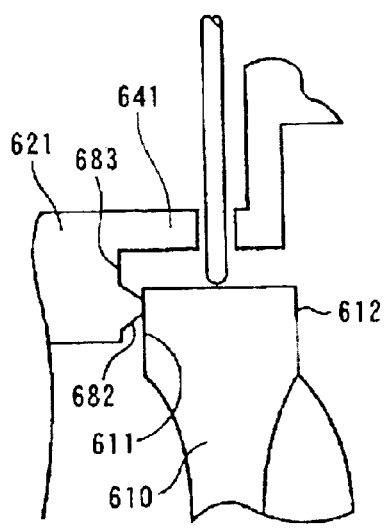
FIG. 15A is a cross section showing an exterior case of the projection lens of the present invention and FIGS. 15B to D are front elevational views of the exterior case.
Figure 15B:
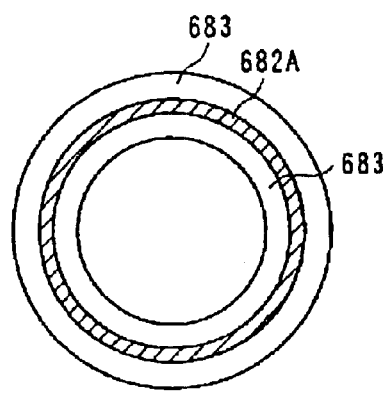

FIG. 15 show a modified first exterior case 621 of the projection lens 46 according to the first embodiment of the present invention, where FIG. 15A represents a cross section and FIGS. 15B, C and D are front plan elevations showing a first step 683 with the second group lens 610 being removed. Incidentally, the same reference numeral will be attached to the same components as FIG. 13 to omit a part of explanation thereof.

In FIG. 15A, a first step 683 of the exterior case 621 has a case projection 682 of trapezoidal cross section or approximately hemicircle cross section.

In FIG. 15B, the case projection 682 is a ring-shaped case projection 682A (shown in oblique line) continuously extending along the whole circumference seen from front side.

Figure 15C:
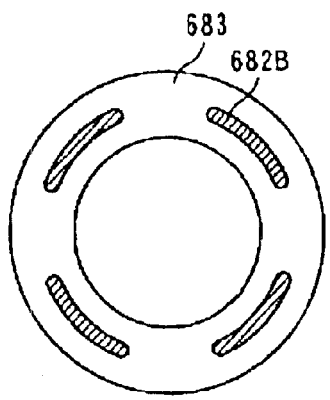

In FIG. 15C, the case projection 682 is an arc-shaped case projection 682B (shown in oblique line) provided on the same circle at an even pitch seen from front side.

Figure 15D:
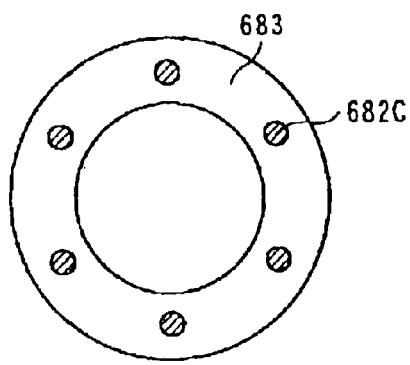

In FIG. 15D, the case projection 682 is an approximately conic frustum case projection 682C (shown in oblique line) provided on the same circle at an even pitch seen from front side.

The cross section of the case projections 682A to C is the same as FIG. 15A.

Since the outer periphery of the lens is evenly supported by the contact portion having linear shape (limited width) of the continuous or intermittent circle or dotted shape provided on the circumference (limited area), the lens can be stably and securely held. Further, when the shift-adjustment of the lens is conducted by pressing the lens-shift adjuster, the lens can be smoothly shifted, so that shift-adjustment of the lens can be easily conducted without tilting the lens, thereby obtaining high-quality projection lens.

The ring-shaped case projection 682A may be disposed in double or triple.

The number of the arc-shaped case projection 682B (i.e. open angle of the arc) may be designed in any manner The arc-shaped case projection 682B may be arranged in multiple. The inner and outer case projections 682B may be located in staggered manner.

In the same manner, the number of the projection 682C may be designed in any manner. The projection 682C may be arranged in multiple. The inner and outer case projections 682C may be located in staggered manner.

(Spacer with Projection)

FIG. 16 is a cross section showing a spacer 660 of the projection lens 46 according to the first embodiment of the present invention.

Figure 16A:
FIGS. 16A to C are cross sections showing a spacer of the projection lens of the present invention.

In FIG. 16A, a ring-shaped spacer projection 661A continuously extends on the entire circumference of the side of the spacer 660 on which the lens is abutted.

Figure 16B:
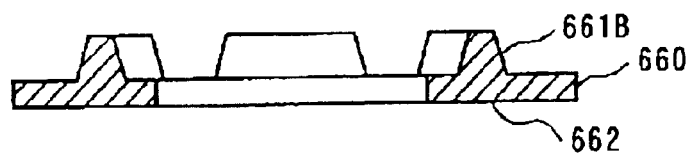

In FIG. 16B, an arc-shaped spacer projection 661B is concentrically provided on the surface of the spacer 660 for the lens to be abutted at an even pitch.

Figure 16C:
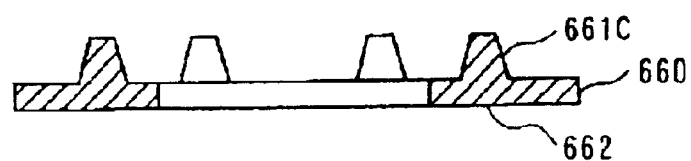

In FIG. 16C, a plurality of approximately conic frustum spacer projection 661C is concentrically provided on the surface of the spacer 660 for the lens to be abutted at an even pitch.

Though the cross section of the spacer projections 661A to 661C is trapezoidal shape, approximately hemicircle or bullet shape may be used.

The open angle (i.e. the length of the arc) of the respective spacer projections 661B may not be equal, but wide projections may be located at an even pitch and narrow projections may be disposed at an even pitch therebetween. The gap between the spacers 660B may be designed in any manner.

The projections 661C may be disposed at an even pitch on the respective multiple circles. At this time, the inner and the outer projections 661C may be arranged in staggered manner.

The spacer 660 may be a unitary molding of flexible and elastic material, or alternatively, only the spacer projections 661A to 661C may be formed of flexible or elastic material.

When the lens is held by the spacer projections 661A to 661C (see FIG. 13B), since the outer periphery of the lens or the lens adapter accommodating the lens is evenly supported by the contact portion abutted to the side 612 of the second group lens 610 having linear shape (limited width) of the continuous or intermittent circle or dotted shape provided on the circumference (limited area), the lens can be stably and securely held. Further, when the shift-adjustment of the lens is conducted by pressing the lens-shift adjuster, the lens can be smoothly shifted, so that shift-adjustment of the lens can be easily conducted without tilting the lens, thereby obtaining high-quality projection lens.

(Plate-Spring Spacer)

Figure 17A:
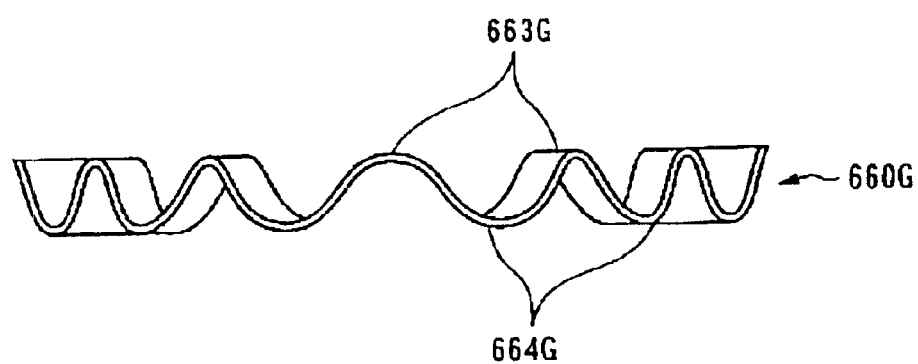
FIG. 17A is a side elevational view of the spacer of the present invention and FIG. 17B is a plan view thereof.
Figure 17B:
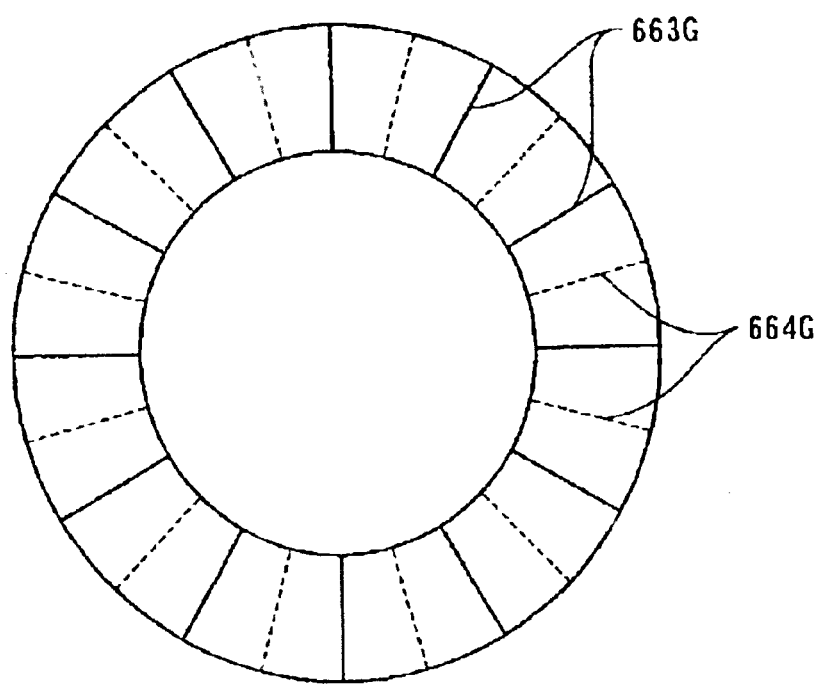

FIG. 17 is a modified spacer of the projection lens of the first embodiment of the present invention, where FIG. 17A is a side elevation and FIG. 17B is a plan view thereof In FIG. 17, a spacer 660G is made of a plate spring deformable in out-plane direction. In other words, the spacer 660G is a ring which is wavy in circumferential direction, where a ridge portion 663G (shown in solid line) and a valley portion 664G (shown in dotted line) are radially disposed at an even pitch.

Since the contact portion of the side 612 of the second group lens 610 and the portion of the retainer 670 to be abutted to the press surface 671 is a plurality of radially-arranged linear shape (predetermined length with limited width) and dotted shape (limited area) on the circle, the outer periphery of the lens or the lens adapter accommodating the lens can be more evenly supported, so that the lens or the lens adapter can be securely and stably adjusted.

Incidentally, since the material or configuration (including height and length of the wave) of the spacer 660G can be selected in any manner, desired pressing force can be easily obtained, so that the pressing force of the retainer 670 pressing the side 612 of the lens 610 can be set so that the lens 610 can be securely fixed while allowing smooth shifting movement by virtue of the spring function of the spacer 660G itself. Accordingly, the lens 610 can be more stably and securely held and, when the lens-shift adjustor is pressed to adjust the shift of the lens 610, the lens 610 can be smoothly moved, thereby easily adjusting the shift of the lens 610 without tilting the lens 610. Further, since the lens 610 does not move after the shift is adjusted, the accuracy of the shift adjustment can be improved, thereby obtaining high-quality projection lens.

(Lens Adapter)

Figure 18A:
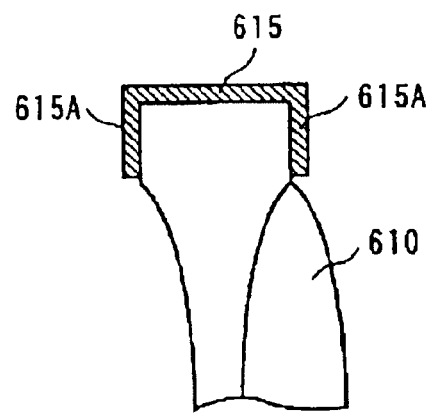
FIGS. 18A and B are cross sections showing a lens adapter of the projection lens of the present invention.

FIG. 18 is a cross section of a lens adapter 615 of the projection lens of the first embodiment of the present invention. In FIG. 18A, the lens 610 is held by the ring-shaped lens adapter 615 provided on the outer circumference thereof and a lens adapter flange 615A is provided on both sides of the lens adapter 615.

Since the fist step 623 of the exterior case 621, the spacers 660 (660G) and the tip end of the lens-shift adjusting stick 650 are not in direct contact with the lens 610, damage on the lens 610 caused by the shock from the lens-shift adjustor or from the outside can be prevented. Further, since the lens-shift adjuster is pressed to the lens 610 through the lens adapter 615, the lens-shift adjuster can be securely abutted without being slid, thus accurately shifting the lens 610.

Figure 18B:
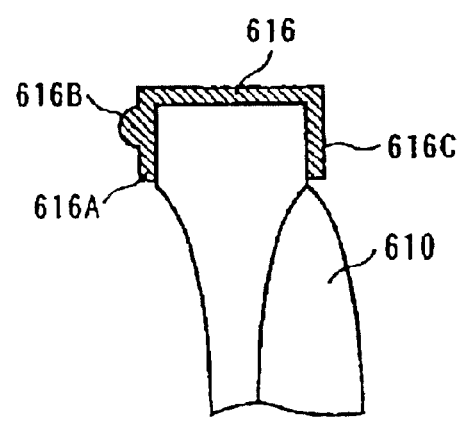

In FIG. 18B, the lens 610 is held by a ring-shaped adapter 616 provided on the outer circumference, and a lens adapter flange 616A having an adapter projection 616B is provided on a side of the lens adapter 616 and a lens adapter flange 616C is provided on the other side.

The arrangement of the adapter projection 616B is the same as the case projection 682A to 682C and the description thereof is omitted.

The function and advantage of the adapter projection 616B can be exerted when the first step 623 of the first exterior case 621 is flat (i.e. has no projection etc.).

Accordingly, the same functions and advantages of the case projections 682A to 682C and the lens adapter 615 can be obtained (Retainer)

FIG. 19 is a cross section of modified retainer 670 of the projection lens of the first embodiment of the present invention.

Figure 19A:
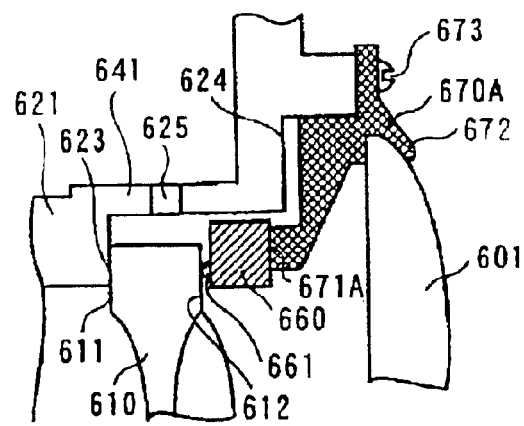
FIGS. 19A to C are cross sections showing a retainer of the projection lens of the present invention.

In FIG. 19A, a press surface 671A of a retainer 670A (shown in cross-hatch) abutted to the spacer 660 cylindrically projects to secure a gap between the second step 624 of the first exterior case 621 and the retainer 670A.

Accordingly, the outer diameter of the press surface 671A, the outer diameter of the spacer 660 and the outer diameter of the outer periphery of the lens 610 can be approximately coincided, thereby reducing the size of the spacer 660. Further, the projection amount of the press surface 671A can be designed as desired, thereby easily adjusting the pressing force of the lens 610.

The retainer 670A is a lens adapter of the first group lens 601, which has a fixing claw 672 for directly fixing the first group lens 601 and is directly fixed on the exterior case 621 by the fixing screw 673.

Figure 19B:
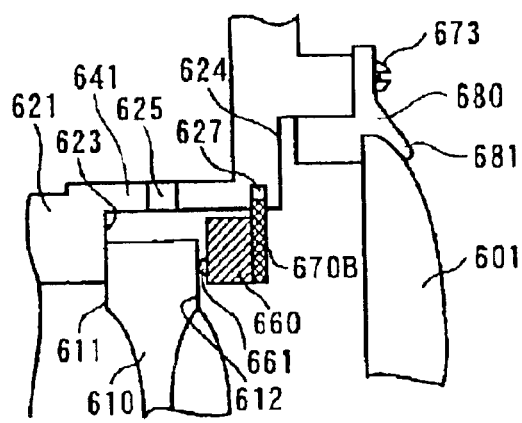

In FIG. 19B, a retainer 670B (shown in cross-hatch) is a component dedicated for pressing the spacer 660, which is a ring made of thin plate.

The retainer 670B is fitted to an approximately C-shaped notch circular groove 627 formed on the inner circumference of the exterior case 621.

Accordingly, the pressing force of the lens 610 can be easily adjusted by selecting the location of the circular groove 627. Incidentally, the adjacent first lens group 601 is attached to a lens adapter 680 by a fixing claw 681. The lens adapter 680 is fixed to the first exterior case 621 by the fixing screw 673.

Figure 19C:
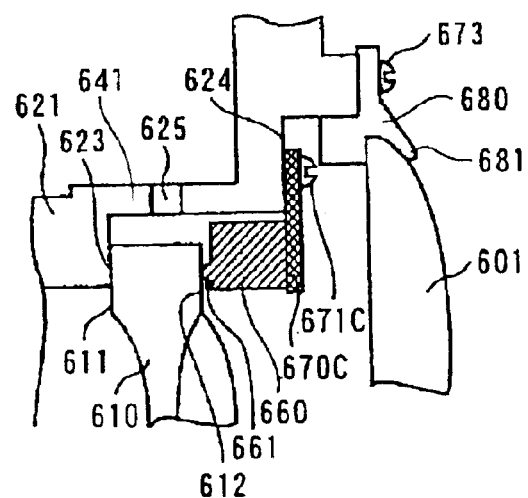

In FIG. 19C, a retainer 670C (shown in cross-hatch) is a component dedicated for pressing the spacer 660, which is a ring of thin plate.

The retainer 670C is fixed on the second step 624 of the exterior case 621 by a retainer fixing screw (bolt) 671C.

Accordingly, the spacer 660 can be pressed with a simple construction. Alternatively, the pressing force of the lens 610 can be adjusted by cylindrically projecting only the area abutted to the spacer 660. Incidentally, adjacent first group lens 601 is attached to the lens adapter 680 by the fixing claw 681. The lens adapter 680 is fixed to the exterior case 621 by the fixing screw 673.

[Second Embodiment]

Figure 20A:
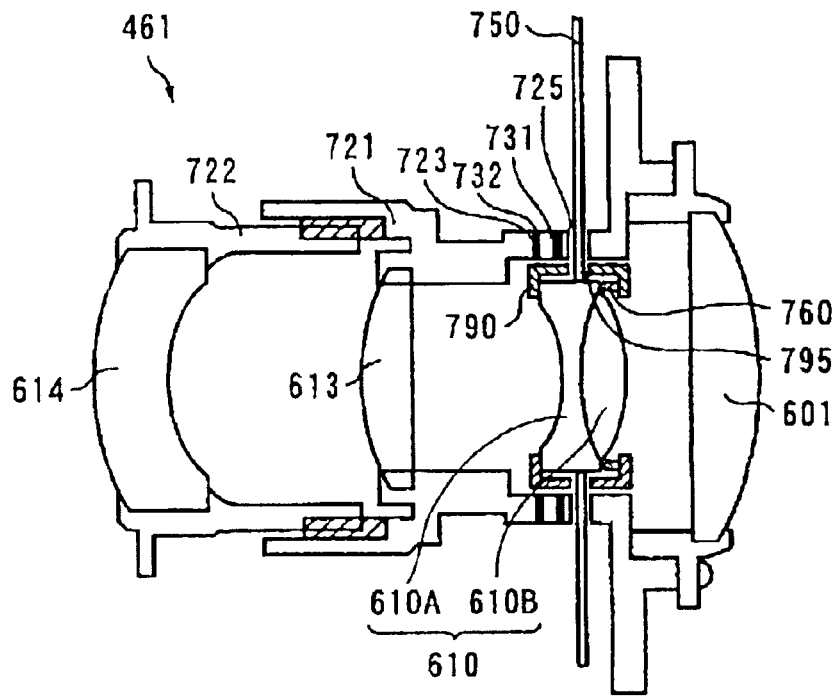
FIG. 20A is an entire view and FIG. 20B is a partly enlarged view thereof.
Figure 20B:
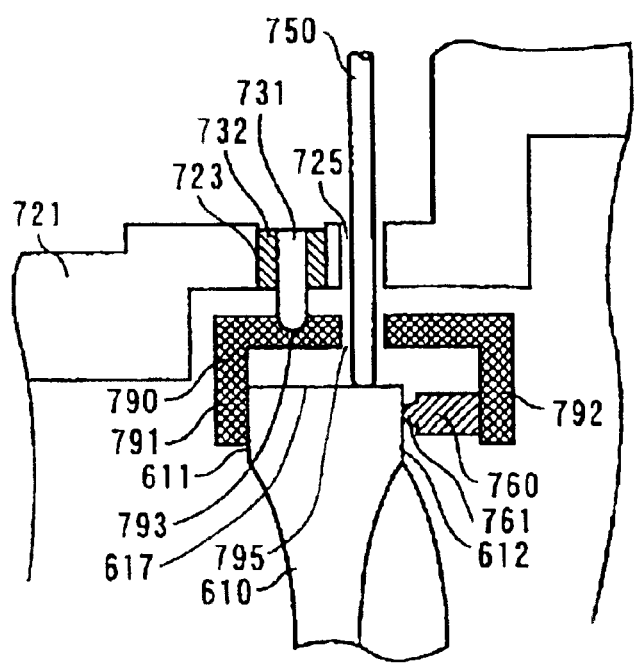

FIG. 20 are cross sections showing a projection lens 461 according to a second embodiment of the present invention, where FIG. 20A is an entire view and FIG. 20B is a partly enlarged view thereof. In FIG. 20, reference numeral 461 represents a projection lens, 610 represents a second group lens (referred to as lens hereinafter), 721 represents a first exterior case (referred to as exterior case hereinafter), 731 represents a cradle-tilting eccentric pin, 732 represents a cradle-tilting eccentric sleeve, 750 represents a lens-shift adjusting stick, 760 represents a flexible or elastic cradle spacer, 790 represents a cradle for accommodating the lens 610, and 725 represents a lens-shifting through-hole (provided on a side of the exterior case 721) for the lens-shift adjusting stick 750 to be penetrated. Incidentally, the arrangement except for the projection lens is the same as the first embodiment and description thereof is omitted. Further, a part of the description of the projection lens arranged in the same manner as the first embodiment is omitted.

(Cradle)

The cradle 790 is a ring having in-cradle flanges 791 and 792 on both ends, which is provided with an engaging cradle concave 793 for the tip end of the cradle-tilting eccentric pin 731 to be engaged on a circumferential surface thereof.

The side 611 of the outer periphery of the second group lens 610 is slidably abutted to one of the in-cradle flange 791 and the other side 612 of the outer periphery of the lens 610 is pressed to the spacer projection 761 of the cradle spacer 760 in slidable manner.

The cradle spacer 760 is held by the other in-cradle flange 792. Specifically, since the cradle spacer 760 is sandwiched and elastically compressed by the lens 610 and the other in-cradle flange 792, the lens 610 is pressed to the in-cradle flange 791 by the elastic repulsive force.

Accordingly, the lens 610 is not easily moved and, when the outer, surface 617 of the lens 610 is pushed, the lens 610 moves along the in-cradle flange 791.

Incidentally, the structure, function and effect of the cradle spacer 760 (including the spacer projection 761) are the same as the spacer 660 (including the spacer projection 661: see FIG. 13), and description thereof is omitted here.

(Cradle-Tilting Eccentric Pin)

Three or four cradle-tilting through-holes 723 are evenly provided on the outer circumference of the first exterior case 721 in the X-Y plane (a plane perpendicular to the axis of the exterior case 720) corresponding to the second group lens 610. The cradle-tilting eccentric sleeve 732 is rotatably provided on the cradle-tilting through-hole 723 and the cradle-tilting eccentric pin 731 is fitted into the cradle-tilting eccentric sleeve 732.

Since the center of the cradle-tilting eccentric pin 731 is displaced from (not coincident with) the rotation center of the cradle-tilting eccentric sleeve 732 (i.e. the center of the cradle-tilting through-hole 723), when the cradle-tilting eccentric sleeve 732 is rotated, the center of the cradle-tilting eccentric pin 731 is moved toward the axis of the first exterior case 721.

Specifically, when the plurality of cradle-tilting eccentric sleeve 732 are rotated, the cradle-tilting eccentric pin 731 guides the cradle 790 to move vertically relative to the X-Y plane, so that the lens 610 is tilted relative to the axis of the first exterior case 721.

Incidentally, the cradle-tilting eccentric sleeve 732 fitted with the cradle-tilting eccentric pin 731 may be called the cradle-tilting eccentric pin 731 (e.g. when the both components are integrally molded).

(Lens-Shift Adjusting Stick)

The plurality of lens-shifting through-holes 725 are provided on the outer circumference of the first exterior case 721 in the X-Y plane corresponding to the second group lens 610, and a lens-shifting cradle through-hole 795 is provided on a side of the cradle 790 on the same phase as the lens-shifting through-hole 725.

Accordingly, after the cradle 790 is tilted by a desired angle, the lens-shift adjusting stick 750 is inserted to the lens-shifting through-hole 725 and the lens-shifting cradle through-hole 795 corresponding to the direction to be shifted and the tip end thereof is brought into contact with the outer surface 617 of the lens 610. The lens-shift adjusting stick 750 is advanced by a predetermined distance to move (shift) the lens 610 to a desired position.

Such shifting method is the same as the first embodiment, and detailed explanation is omitted here. The cradle-tilting through-hole 723 and the lens-shifting through-hole 725 may be located on the same plane. The number of the cradle-tilting through-hole 723 and the lens-shifting through-hole 725 is not specifically determined and may be designed in different manner (for instance, the cradle-tilting through-hole 723 may be located on three positions and the lens-shifting through-hole 725 may be located on four positions).

(Lens-Shifting Screw Stick)

Figure 21A:
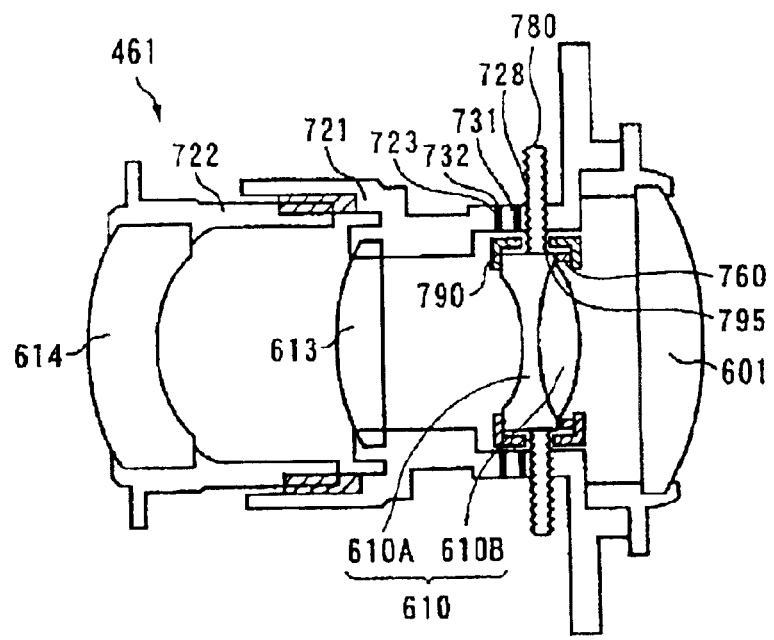
FIGS. 21A and B are cross sections showing the projection lens of the present invention with a screw stick provided thereon.
Figure 21B:
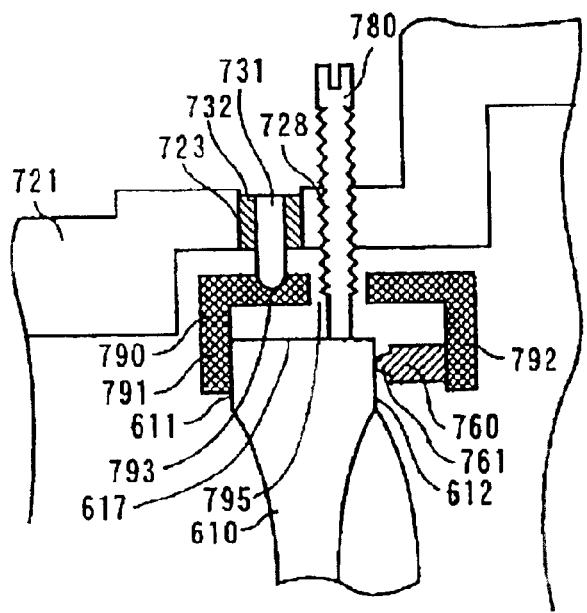
Figure 22:
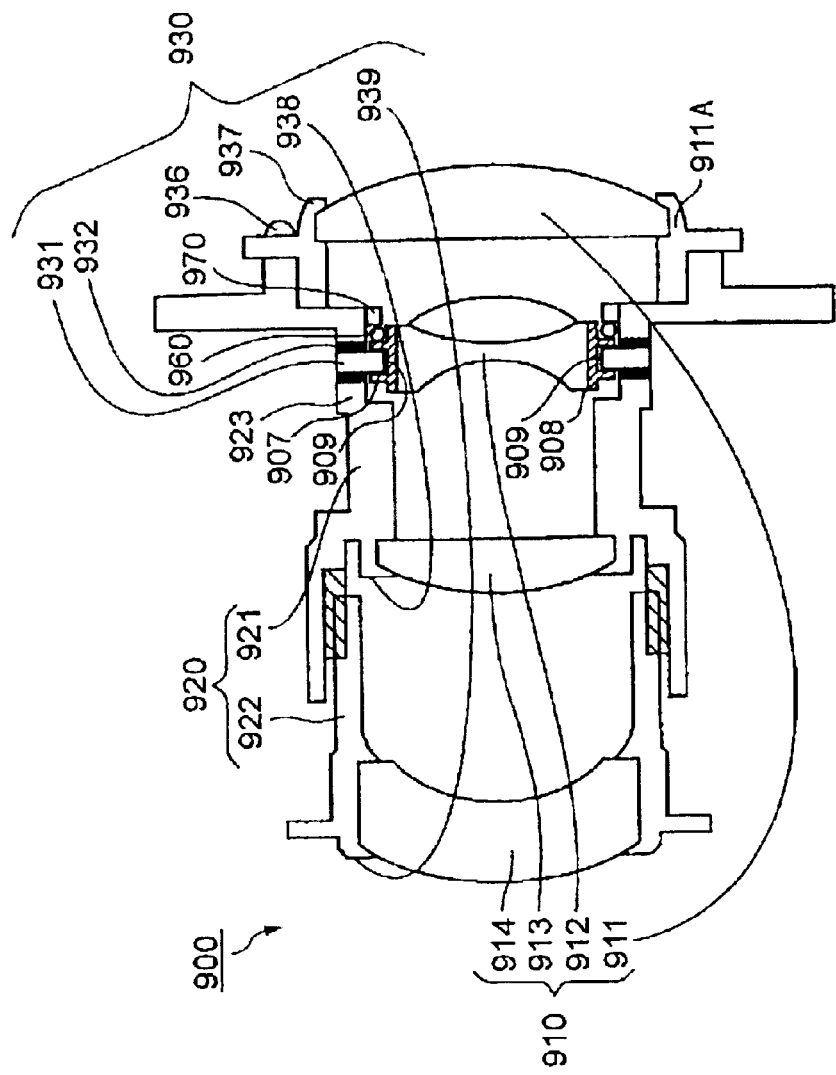
FIG. 22 is a cross section showing a conventional projection lens.
Figure 23A:
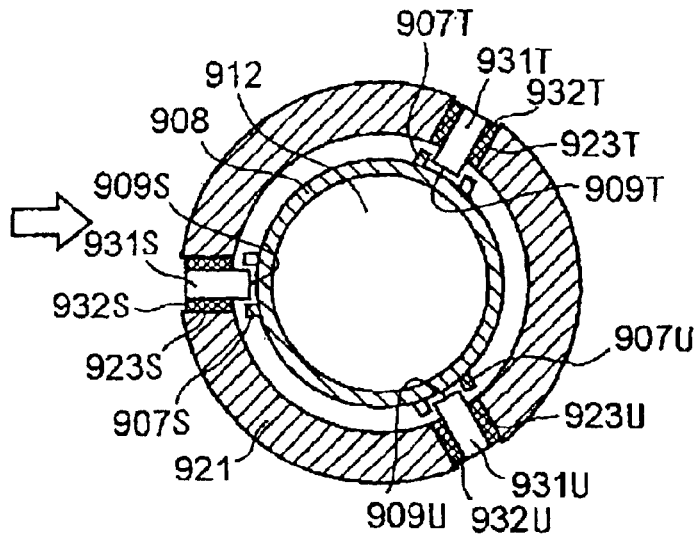
FIGS. 23A and B are schematic illustrations showing a tilting eccentric pin of the conventional projection lens.
Figure 23B:
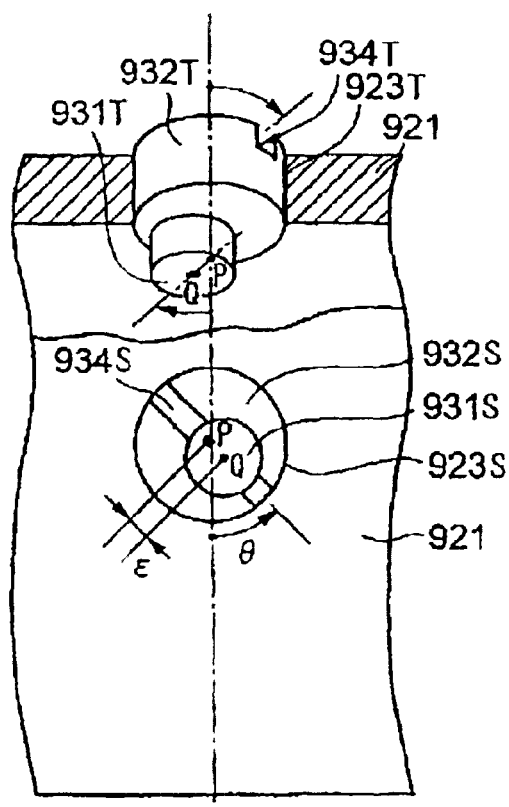

FIG. 21 is a cross section showing the projection lens 461 according to the second embodiment of the present invention with a lens-shifting screw stick 780 being mounted. In other words, the lens-shifting screw stick 780 is used instead of the lens-shift adjusting stick 750.

In FIG. 21, reference numeral 461 represents the projection lens, 721 represents a first exterior case and 780 represents the lens-shifting screw stick. The same reference numeral will be attached to the same components as FIG. 20 to omit a part of explanation thereof.

Three or four cradle-tilting through-holes 723 are provided at an even pitch on the outer circumference of the exterior case 721 in a plane perpendicular to the axis of the exterior case 721. The cradle-tilting eccentric sleeve 732 is rotatably provided in the cradle-tilting through-hole 723 and the cradle-tilting eccentric pin 731 is fitted into the cradle-tilting eccentric sleeve 732. Accordingly, the cradle 790 can be tilted in the same manner as the above. The detailed explanation is omitted.

Three or four lens-shifting screw holes 728 are formed on the outer circumference of the exterior case 721 on a plane perpendicular to the axis of the exterior case 721 (referred to as X-Y plane hereinafter) corresponding to the lens 610 and the lens-shifting cradle through-hole 795 is provided on a side of the cradle 790 on the same phase as the lens-shifting screw hole 728.

Accordingly, after tilting the cradle 790 at a desired angle, the lens-shifting screw stick 780 is screwed to be advanced in the lens-shifting screw hole 728 corresponding to the direction to be shifted on the X-Y plane, so that the tip end thereof is abutted to the outer surface 617 of the second group lens 610 penetrating through the lens-shifting cradle through-hole 795. The lens 610 can be shifted to a desired position by rotating the lens-shifting screw stick 780 by a predetermined angle. Such shifting method is the same as the above description and detailed explanation is omitted.

The cradle-tilting through-hole 723 and the lens-shifting screw hole 728 may be located on the same plane. The number of both of the components is not limited and may be arranged differently (for instance, three cradle-tilting through-holes 723 per four lens-shifting screw hole 728).

After completing such tilt adjustment and shift adjustment, the lens 610 can be fixed as described above.

As described above, the tilt adjustment and accurate shift adjustment can be easily conducted, thereby enhancing the performance of the projection lens and reducing the production cost thereof.

[7. Modification of Embodiment]

The scope of the present invention is not restricted to the above embodiments, but includes other arrangements as long as an object of the present invention can be achieved, which includes following modifications.

For instance, though the attitude of the lens is adjusted by the stick components inserted by the operator himself, the position may be automatically adjusted by a computer control. In this arrangement, the image projected on a screen is taken by a CCD camera etc. and is image-processed by a computer to adjust the position of the lens to be adjusted.

Though the number of the lens-shifting through-hole is four in the above embodiment, the number may be less or more than four. The holes may be circular hole, ellipsoidal hole, elongated hole or square hole etc. For instance, when the hole is designed as an elongated hole extending in a direction along the illumination optical axis, the lens to be adjusted can be also adjusted in a direction parallel to the illumination optical axis, so that the tilt of the lens relative to the illumination optical axis can be adjusted according to the location of the elongated hole.

Though ultra-violet curing adhesive is used as the adhesive in the above embodiment, other adhesive such as instant adhesive may be used.

Though the projection lenses 46 and 461 are used for the projector 1, the projection lens may be used to other electronics.

Though a projector having three optical modulators is used in the above embodiments, a projector having one optical modulator, two optical modulators or more than three optical modulator may be used. Though the liquid crystal panels is used as the optical modulator, another optical modulator such as a device using a micro-mirror may be used. A reflective optical modulator may be used instead of transmissive optical modulator.

The term "transmissive" refers to a type where a light valve such as a liquid crystal panel transmits light. The term "reflective" refers to a type where the light valve reflects the light.

In a reflective projector, the light valve can be constructed solely by a liquid crystal panel and a pair of polarizing plates are not necessary. In the reflective projector, the cross dichroic prism may be used as a light combining system for combining the modulated three color lights again and irradiating the light in the same direction as well as a light separating system for separating the lights irradiated from a light source into three color lights of red, green and blue.

A dichroic prism combining a plurality of triangle or square pillar prisms may be used instead of cross dichroic prism.

Though two lens arrays 31 and 32 for splitting the light of the light source 83 into a plurality of sub-beams are used in the projector 1, the present invention may be used to a projector using no such lens array.

The specific arrangement and configuration in implementing the present invention may be designed in any manner as long as an object of the present invention can be achieved.

The entire disclosure of Japanese Patent Applications No. 2002-4092790 filed on Mar. 28, 2002 and No. 2002-310724 filed on Oct. 25, 2002 including specification, claims, drawings and summary are incorporated herein by reference in its entirety.

What is claimed is:

1. A projection lens, comprising:
   a cylindrical exterior case having a lens-shifting through-hole on a side thereof;
   a plurality of lenses;
   a step portion or flange that is provided on an inner circumference of the exterior case, a periphery of a first side of at least one of the plurality of lenses being in contact with the step portion or the flange;
   a retainer; and
   a flexible or elastic spacer that abuts on a periphery of a second side of the lens, the spacer being pressed by the retainer to hold the lens on the exterior case.

2. The projection lens according to claim 1,
   the step portion or the flange having a ring-shaped projection or an arc-shaped or a dot-shaped projection arranged in circle.

3. The projection lens according to claim 1, further comprising a lens adapter that accommodates the lens, a periphery of the lens adapter being provided with a ring-shaped projection or an arc-shaped or a dot-shaped projection arranged in circle.

4. The projection lens according to claim 1, the spacer comprising a ring-shaped projection or an arc-shaped or a dot-shaped projection arranged in circle.

5. The projection lens according to claim 1, the spacer being a plate spring capable of deformation in an out-plane direction.

6. The projection lens according to claim 1, further comprising:
   an adjacent-lens that is located adjacent to the lens; and
   an adjacent-lens adapter that accommodates the adjacent lens, the adjacent-lens adapter working as the retainer.

7. The projection lens according to claim 1, further comprising a through-hole that is formed on the exterior case to inject an adhesive.

8. A projection lens, comprising:
   a cylindrical exterior case having a lens-shifting through-hole and a cradle-tilting through-hole on a side thereof;
   a plurality of lenses;
   a cradle-tilting eccentric sleeve that is rotatable in the cradle-tilting through-hole;
   a cradle-tilting eccentric pin having a center that is eccentric relative to a rotation center of the cradle-titling eccentric sleeve, the cradle-tilting eccentric pin being fitted to an inner circumference of the cradle-tilting eccentric sleeve;
   a cylindrical cradle that is guided by the cradle-tilting eccentric pin to be capable of tilting relative to an axis of the exterior case;
   a periphery of a first side of at least one of the plurality of lenses is abutted to a first inner side of the cradle; and
   a flexible or elastic cradle spacer that is interposed between an outer periphery of second side of the lens and a second inner side of the cradle to hold the lens in the cradle.

9. The projection lens according to claim 8, the first inner side of the cradle having a ring-shaped projection or an arc-shaped or a dot-shaped projection arranged in circle.

10. The projection lens according to claim 8, further comprising a lens adapter that accommodates the lens, an outer periphery of the lens adapter being provided with a ring-shaped projection or an arc-shaped or a dot-shaped projection arranged in circle.

11. The projection lens according to claim 8,
    the cradle spacer comprising a ring-shaped projection or an arc-shaped or a dot-shaped projection arranged in circle.

12. The projection lens according to claim 8, the cradle spacer being a plate spring capable of deformation in an out-plane direction.

13. The projection lens according to claim 8, further comprising a through-hole that is formed on the exterior case to inject an adhesive.

14. A projector, comprising:
    a light source;
    an optical device that modulates a light beam irradiated by the light source in accordance with image information to form an optical image; and
    a projection lens that enlarges and projects the optical image,
    the projection lens comprising:
      a cylindrical exterior case having a lens-shifting through-hole on a side thereof,
      a plurality of lenses;
      a step portion or a flange that is provided on the inner circumference of the exterior case, a periphery of a first side of at least one of the plurality of lenses being in contact with the step portion or the flange;
      a retainer, and
      a flexible or elastic spacer that abuts on a periphery of a second side of the lens, the spacer being pressed by the retainer to hold the lens on the exterior case.

15. The projector according to claim 14, the spacer is a plate spring capable of deformation in an out-plane direction.

16. The projector according to claim 14, further comprising a through-hole that is formed on the exterior case to inject an adhesive.

17. A producing method of a projection lens that includes:
    a cylindrical exterior case having a lens-shifting through-hole on a side thereof;
    a plurality of lenses;
    a step portion or flange that is provided on the inner circumference of the exterior case;
    a retainer, and
    a flexible or elastic spacer,
    the method comprising:
      abutting a periphery of at least one of the plurality of lenses to a first side of the step portion or the flange;
      holding the lens in the exterior case by pressing a periphery of a second side of the lens with the retainer through a flexible or elastic spacer; and adjusting a shift amount of the lens by shifting the lens with a lens-shift adjuster through the lens-shifting through-hole.

18. A producing method of a projection lens, the projection lens including:
a cylindrical exterior case;
a plurality of lenses;
a cradle-tilting eccentric sleeve that is rotatable in the cradle-tilting through-hole;
a cradle-tilting eccentric pin having a center that is eccentric relative to a rotation center of the cradle-tilting eccentric sleeve, the cradle-tilting eccentric pin being fitted to an inner circumference of the cradle-tilting eccentric sleeve;
a cylindrical cradle that is capable of tilting relative to an axis of the exterior case; and
a flexible or elastic spacer,
the method comprising the steps of:
abutting a periphery of a first side of at least one of the plurality of lenses to a first inner side of the cradle;
holding the lens on the cradle with a flexible or elastic cradle spacer interposed between a periphery of a second side of the lens and a second inner side of the cradle;
adjusting a tilt of the lens by guiding the cradle by the cradle-tilting eccentric pin; and
adjusting a shift amount of the lens by shifting the lens with a lens-shift adjuster through a lens-shifting through-hole.

19. The projector of the flange having a ring-shaped projection or an arc-shaped or a dot-shaped projection arranged in circle.

20. The projector according to claim 14, further comprising a lens adapter that accommodates the lens, a periphery of the lens adapter being provided with a ring-shaped projection or an arc-shaped or a dot-shaped projection arranged in circle.

21. The projector according to claim 14, the spacer comprising a ring-shaped projection or an arc shaped or a dot-shaped projection arranged in circle.

22. The projector according to claim 14, further comprising:
an adjacent-lens that is located adjacent to the lens; and
an adjacent-lens adapter that accomodates the adjacent lens, the adjacent-lens adapter working as the retainer.

23. A projector, comprising:
a light source;
an optical device that modulates a light beam irradiated by a light source in accordance with the image information to form an optical image; and
a projection lens that enlarges and projects the optical image,
the projection lens comprising:
a cylindrical exterior case having a lens-shifting through-hole and a cradle-tilting through-hole on a side thereof;
a plurality of lenses;
a cradle-tilting eccentric that is rotatable in the cradle-tilting through-hole;
a cradle-tilting eccentric pin having a center that is eccentric relative to a rotation center of the cradle-tilting eccentric sleeve, the cradle-tilting eccentric pin being fitted to the inner circumference of the cradle-tilting eccentric sleeve;
a cylindrical cradle that is guided by the cradle-tilting accentric pin to be capable of tilting relative to an axis of the exterior case;
a periphery of a first side of at least one of the plurality of lenses is abutted to a first inner side of the cradle; and
a flexible or elastic cradle spacer that is interposed between an outer periphery of a second side of the lens and a second inner side of the cradle to hold the lens in the cradle.

24. The projector according to claim 23, the first inner side of the cradle having a ring-shaped projection or an arc-shaped or a dot-shaped projection arranged in circle.

25. The projector according to claim 23, further comprising a lens adapter that accommodates the lens, an outer periphery of the lens adapter being provided with a ring-shaped projection or an arc-shaped or a dot-shaped projection or an arc-shaped or a dot-shaped projection arranged in circle.

26. The projector according to claim 23,
the cradle spacer comprising a ring-shaped projection of an arc-shaped or a dot-shaped projection arranged in circle.

27. The projector according to claim 23, the cradle shaper being a plate spring capable of deformation in an out plane direction.

28. The projector according to claim 23, further comprising a through-hole that is formed on the exterior case to inject an adhesive.

* * * * *

UNITED STATES PATENT AND TRADEMARK OFFICE
CERTIFICATE OF CORRECTION

PATENT NO.       : 7,061,699 B2  
APPLICATION NO.  : 10/396377  
DATED            : June 13, 2006  
INVENTOR(S)      : Nobuo Watanabe et al.

Page 1 of 1

It is certified that error appears in the above-identified patent and that said Letters Patent is hereby corrected as shown below:

Please correct the title as follows:

(54)   Projection Lens, Producing Method of Projection Lens and Projector Having the Projection Lens Please correct the Inventors as follows:

(75)   Nobuo Watanabe, Shiojiri (JP); Shuji Narimatsu, Suwa (JP); Tomonobu Machida, Shiojiri (JP); Shunji Umemura, Minami-Azumigun (JP); Shohei Fujisawa, Matsumoto (JP)

Signed and Sealed this

Twentieth Day of February, 2007

JON W. DUDAS  
*Director of the United States Patent and Trademark Office*